(12) United States Patent
Fujimura

(10) Patent No.: US 9,749,037 B2
(45) Date of Patent: Aug. 29, 2017

(54) DEMULTIPLEXING APPARATUS, MULTIPLEXING APPARATUS, AND RELAY APPARATUS

(71) Applicant: MITSUBISHI ELECTRIC CORPORATION, Chiyoda-ku (JP)

(72) Inventor: Akinori Fujimura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/779,280

(22) PCT Filed: Apr. 18, 2013

(86) PCT No.: PCT/JP2013/002622
§ 371 (c)(1),
(2) Date: Sep. 22, 2015

(87) PCT Pub. No.: WO2014/170927
PCT Pub. Date: Oct. 23, 2014

(65) Prior Publication Data
US 2016/0056883 A1 Feb. 25, 2016

(51) Int. Cl.
*H04B 7/204* (2006.01)
*H04B 1/00* (2006.01)

(52) U.S. Cl.
CPC .......... *H04B 7/2045* (2013.01); *H04B 1/005* (2013.01)

(58) Field of Classification Search
CPC ....... H04B 1/005; H04B 7/2045; H04B 7/204
(Continued)

(56) References Cited

U.S. PATENT DOCUMENTS 5,621,786 A * 4/1997 Fischer ............... H04W 88/085
370/331
8,743,914 B1 * 6/2014 Jensen .................... H04B 7/086
370/310
(Continued)

FOREIGN PATENT DOCUMENTS

CA 2 898 183 A1 7/2014
EP 2 184 866 A1 5/2010
(Continued)

OTHER PUBLICATIONS

Fumihiro Yamashita, et al., "A Proposal of Onboard Bandwidth-variable FFT Filter Banks and its Fundamental Characteristics", The Institute of Electronics, Information and Communication Engineers, Transaction B, vol. J85-B, No. 12, pp. 2290-2299 (Dec. 2002).
(Continued)

*Primary Examiner* — Sai-Ming Chan
(74) *Attorney, Agent, or Firm* — Oblon, McClelland, Maier & Neustadt, L.L.P.

(57) ABSTRACT

A demultiplexing apparatus includes a signal receiving unit that receives signals, an analog demultiplexing unit that analog-demultiplexes, in predetermined units of channels, received signals received by the signal receiving unit and generates analog demultiplexed signals, and a plurality of digital demultiplexing units that digital-demultiplex the analog demultiplexed signals in units of sub-channels and generate digital demultiplexed signals. The analog demultiplexing unit controls, concerning the analog demultiplexed signals output to the digital demultiplexing units, a total value of bandwidths in which a signal is present so as to be a predetermined value or less.

10 Claims, 9 Drawing Sheets

(58) Field of Classification Search
USPC .......................................................... 370/325
See application file for complete search history.

(56) References Cited

U.S. PATENT DOCUMENTS

| | | |
|---|---|---|
| 9,136,933 B2 | 9/2015 | Fujimura |
| 2004/0097192 A1 | 5/2004 | Schiff |
| 2004/0185775 A1 | 9/2004 | Bell et al. |
| 2009/0174822 A1* | 7/2009 | Pugel .................. H04N 5/4401 348/731 |
| 2009/0191810 A1 | 7/2009 | Sogabe et al. |
| 2009/0240507 A1* | 9/2009 | Jax ........................ G10L 19/022 704/500 |
| 2009/0247179 A1 | 10/2009 | Bell et al. |
| 2010/0109928 A1 | 5/2010 | Chen |
| 2010/0259433 A1 | 10/2010 | Bishop et al. |
| 2011/0222467 A1* | 9/2011 | Fujimura .................. H04J 1/08 370/316 |
| 2014/0036765 A1 | 2/2014 | Fujimura et al. |
| 2014/0226555 A1 | 8/2014 | Bell et al. |

FOREIGN PATENT DOCUMENTS

| | | |
|---|---|---|
| JP | 2006-516867 A | 7/2006 |
| JP | 2010-530150 A | 9/2010 |
| WO | 2004/010610 A1 | 1/2004 |
| WO | 2007/135902 A1 | 11/2007 |
| WO | 2012/026417 A1 | 3/2012 |
| WO | 2012/147753 A1 | 11/2012 |
| WO | 2014/112040 A1 | 7/2014 |

OTHER PUBLICATIONS

Japanese Notice of Rejection issued on Aug. 25, 2015 for JP 2015-512202 (with English Translation).

Akinori Fujimura, et al., "A Study of Wideband Digital Satellite Transponders", The Journal of the Institute of Electronics, Information and Communication Engineers, pp. 329 (Mar. 6, 2012).

Akinori Fujimura, et al., "A Study of Flexible Wideband Digital Satellite Transponders", The Journal of the Institute of Electronics, Information and Communication Engineers, pp. 334 (Mar. 5, 2013).

Akinori Fujimura, et al., "A Study of Digital Demultiplexer/Multiplexer for Digital Satellite Transponders", The Journal of the Institute of Electronics, Information and Communication Engineers, pp. 271 (Aug. 28, 2012).

International Search Report issued on Jun. 11, 2013 for PCT/JP2013/002622 filed on Apr. 18, 2013.

Extended European Search Report issued Nov. 14, 2016 in Patent Application No. 13882502.1.

Office Action dated Apr. 28, 2017 in Canadian Patent Application No. 2,909,020.

* cited by examiner (a) INPUT SPECTRUM

UNNECESSARY WAVE REMOVAL AND WAVEFORM SHAPING (b) OUTPUT SPECTRUM

DEMULTIPLEXING APPARATUS, MULTIPLEXING APPARATUS, AND RELAY APPARATUS

FIELD

The present invention relates to a demultiplexing apparatus that demultiplexes a signal, a multiplexing apparatus that multiplexes a plurality of signals, and a relay apparatus.

BACKGROUND

To realize effective use of a frequency in satellite communication, there has been proposed a relay satellite mounted with a digital channelizer that relays data from a plurality of uplink beams to a plurality of downlink beams. A technology concerning the relay satellite mounted with the digital channelizer is disclosed in Patent Literature 1.

The digital channelizer disclosed in Patent Literature 1 receives uplink signals from beam areas in a plurality of ports and thereafter demultiplexes the uplink signals in a unit of a sub-channel. A route of demultiplexed signals is set through a switch. The demultiplexed signals are input to a multiplexing unit corresponding to ports at transmission destinations. A multiplexed signal is transmitted from a plurality of ports as a downlink signal. The power consumption of the digital channelizer increases in proportion to the number of ports. A technology for solving this problem is disclosed in Patent Literature 2.

Patent Literature 2 mentions that uplink signals from a plurality of beam areas are collectively analog/digital-converted after being multiplexed to reduce the number of A/D converters and attain a reduction in power consumption.

Non Patent Literature 1 discloses, as a demultiplexing and multiplexing system, a proposal of a system in which a polyphase filter and FFT (or IFFT) are used.

CITATION LIST

Patent Literature

Patent Literature 1: Japanese Translation of International Patent Application No. 2006-516867
Patent Literature 2: Japanese Translation of International Patent Application No. 2010-530150
Non Patent Literature 1: Fumihiro Yamashita, Hiroshi Kazama, and Yoshinori Nakasuga "a Proposal Of Onboard Bandwidth-variable FFT Filter Banks and its Fundamental Characteristics" The Institute of Electronics, Information and Communication Engineers Transaction B Vol. J85-B No. 12 pp. 2290-2299 December 2002

SUMMARY

Technical Problem

However, use bandwidths of the uplink signals and the downlink signals change every moment because of position distribution, calling, and the like of a user. In this case, in the conventional technologies (Patent Literature 1 and Patent Literature 2), the digital channelizer is designed taking into account concentration of traffic and on the premise that an assumed maximum bandwidth is input. For example, when signals from N beams are relayed, even if an average bandwidth of one beam is 333 [MHz], if a maximum bandwidth is 1 GHz, because the maximum bandwidth is taken into account, it is necessary to design a digital channelizer that can relay a signal band of N [GHz] (=1 GHz×N), and thus, circuit resources and power consumption increase.

The present invention has been devised in view of the above problems and it is an object of the present invention to obtain a demultiplexing apparatus, a multiplexing apparatus, and a relay apparatus that, even when use bandwidths of beams change every moment, flexibly cope with the change and realize a reduction in the size and a reduction in a power consumption of a channelizer.

Solution to Problem

In order to solve the aforementioned problems, a demultiplexing apparatus according to one aspect of the present invention is constructed to include: a signal receiving unit that receives signals; an analog demultiplexing unit that analog-demultiplexes, in predetermined units of channels, received signals received by the signal receiving unit and generates and outputs analog demultiplexed signals; and a plurality of digital demultiplexing units that digital-demultiplex, in units of sub-channels, the analog demultiplexed signals output from the analog demultiplexing unit and generate digital demultiplexed signals, wherein the analog demultiplexing unit controls, concerning the analog demultiplexed signals output to the digital demultiplexing units, a total value of bandwidths in which a signal is present so as to be a predetermined value or less.

A multiplexing apparatus according to another aspect of the present invention is constructed to include: a switch matrix unit that outputs a plurality of digital demultiplexed signals demultiplexed into sub-channels; a plurality of digital multiplexing units that receive the digital demultiplexed signals, digital-multiplex the digital demultiplexed signals in predetermined units of channels, and generate digital multiplexed signals; and an analog multiplexing unit that analog-multiplexes the digital multiplexed signals and generates analog multiplexed signals, wherein the switch matrix unit controls a total value of bandwidths of the digital demultiplexed signals output to the digital multiplexing units so as to be a predetermined value or less.

A relay apparatus according to further aspect of the present invention is constructed to include: a signal receiving unit that receives signals; an analog demultiplexing unit that analog-demultiplexes, in predetermined units of channels, received signals received by the signal receiving unit and generates and outputs analog demultiplexed signals; a plurality of digital demultiplexing units that digital-demultiplex the analog demultiplexed signals in units of sub-channels and generate digital demultiplexed signals; a switch matrix unit that outputs a plurality of the demultiplexed digital demultiplexed signals; a digital multiplexing unit that receives the digital demultiplexed signals output from the switch matrix unit, digital-multiplexes the digital demultiplexed signals in predetermined units of channels, and generates digital multiplexed signals; and an analog multiplexing unit that analog-multiplexes the digital multiplexed signals and generates analog multiplexed signals, wherein the analog demultiplexing unit controls, concerning the analog demultiplexed signals output to the digital demultiplexing units, a total value of bandwidths in which a signal is present so as to be a predetermined value or less.

A relay apparatus according to still further aspect of the present invention is constructed to include: a signal receiving unit that receives signals; an analog demultiplexing unit that analog-demultiplexes, in predetermined units of channels, received signals received by the signal receiving unit and generates and outputs analog demultiplexed signals; a plurality of digital demultiplexing units that digital-demultiplex the analog demultiplexed signals in units of sub-channels and generate digital demultiplexed signals; a switch matrix unit that outputs a plurality of the demultiplexed digital demultiplexed signals; a digital multiplexing unit that receives the digital demultiplexed signals output from the switch matrix unit, digital-multiplexes the digital demultiplexed signals in predetermined units of channels, and generates digital multiplexed signals; and an analog multiplexing unit that analog-multiplexes the digital multiplexed signals and generates analog multiplexed signals, wherein the switch matrix unit controls a total value of bandwidths of the digital demultiplexed signals output to the digital multiplexing units so as to be a predetermined value or less.

Advantageous Effects of Invention

In the demultiplexing apparatus of the present invention, the analog demultiplexing unit of the demultiplexing apparatus controls, concerning the analog demultiplexing signals output to the digital demultiplexing units, the total value of the bandwidths in which signals are present to the predetermined value or less. Consequently, even when the use bandwidths change every moment, it is possible to flexibly cope with the change and realize a reduction in the size and a reduction in the power consumption of a channelizer.

In the multiplexing apparatus of the present invention, the switch matrix unit of the multiplexing apparatus controls the total value of the digital demultiplexing signals output to the digital multiplexing units to the predetermined value or less. Consequently, even when the use bandwidths change every moment, it is possible to flexibly cope with the change and realize a reduction in the size and a reduction in the power consumption of a channelizer.

DESCRIPTION OF EMBODIMENTS

First Embodiment

In this embodiment, a demultiplexing apparatus, a multiplexing apparatus, and a relay apparatus are explained that, even when use bandwidths of beams change every moment, realizes a reduction in the size and a reduction in the power consumption of a channelizer while coping with the change.

Figure 1:
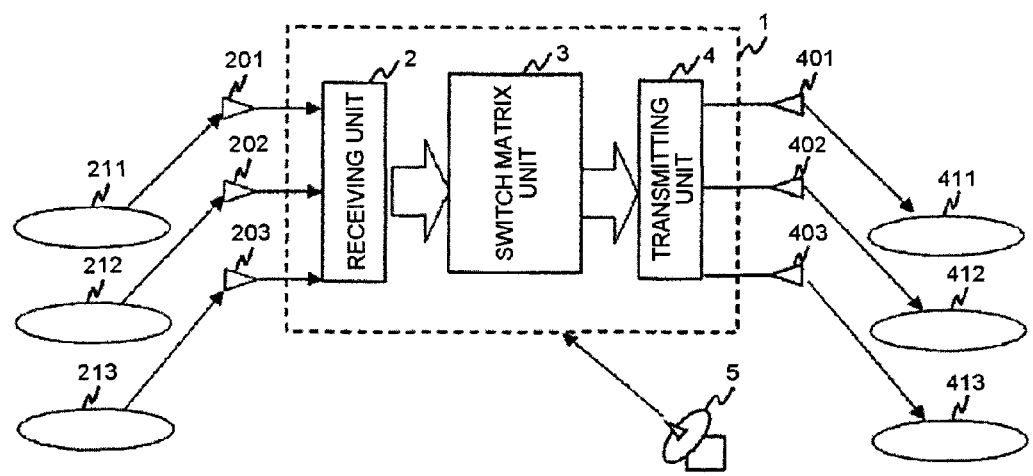
FIG. 1 is a diagram showing a relay apparatus configuration and a communication system in a first embodiment.

FIG. 1 is a diagram showing the configuration of a relay apparatus 1 in this embodiment. The relay apparatus 1 is configured by a receiving unit 2, a switch matrix unit 3, a transmitting unit 4, reception antennas (signal receiving units) 201 to 203, and transmission antennas 401 to 403. The relay apparatus 1 transmits uplink signals from the beam areas 211 to 213 received by the reception antennas 201 to 203, in a downlink from the transmission antennas 401 to 403 (signal transmitting units) toward beam areas 411 to 413 that are transmission destinations.

Each of the uplink signals is a multicarrier obtained by combining a plurality of user signals. Therefore, the receiving unit 2 demultiplexes each of the uplink signals into a plurality of sub-carriers. The receiving unit 2 is configured by a reception analog switch matrix 21 (an analog demultiplexing unit) and a plurality of digital demultiplexing substrates (digital demultiplexing units) 22 to 24. The operation of each of the units of the receiving unit 2 is controlled by a control signal sent from a control station 5 via a separate line.

The switch matrix unit 3 outputs, on the basis of the control signal from the control station 5, the sub-carriers demultiplexed by the receiving unit 2 to the transmitting unit 4 in such a manner as to correspond to desired beam areas and frequency positions.

The transmitting unit 4 multiplexes, per each beam area, sub-carrier signals input from the switch matrix unit 3 and transmits the sub-carrier signals in a downlink. The transmitting unit 4 is configured by a plurality of digital multiplexing substrates (digital multiplexing units) 42 to 44 and a transmission analog switch matrix 41 (an analog multiplexing unit). The operation of each of the units of the transmitting unit 4 is controlled by a control signal sent from the control station 5 via a separate line.

Note that, in the explanation in this embodiment, the number of beam areas in the uplink is three and the number of beam areas in the downlink is three. However, the number of the beam areas is not limited to three.

The operation of the relay apparatus is separately explained for the operation on a reception side and for the operation on a transmission side.

<Operation on the Reception Side>

The configuration of the receiving unit 2 in the relay apparatus 1 is explained with reference to FIG. 2. The receiving unit 2 includes the reception analog switch matrix 21 and the digital demultiplexing substrates 22 to 24. The digital demultiplexing substrate 22 includes demultiplexing units 221 to 223 and a digital switch unit 224. The digital demultiplexing substrate 23 includes demultiplexing units 231 to 233 and a digital switch unit 234. The digital demultiplexing substrate 24 includes demultiplexing units 241 to 243 and a digital switch unit 244. Spectra 31 to 33 are general ideas for each spectrum of uplink signals from the beam areas 211 to 213. Alphabets A to I described in the spectra 31 to 33 indicate channel names for each frequency band. Numbers in parentheses indicate, in a GHz unit, bandwidths in which signals are present. The bandwidths are signal bandwidths actually used in relevant channels.

In the following explanation, a maximum specification bandwidth of one beam area is assumed to be 1 GHz. The antenna 201 receives 0.3 GHz of the uplink signal from the beam area 211. The antenna 202 receives 0.6 GHz of the uplink signal from the beam area 212. The antenna 203 receives 0.1 GHz of the uplink signal from the beam area 213.

Subsequently, the reception analog switch matrix 21 analog-demultiplexes, in units of channels (0.333 GHz), received signals received by the reception antennas 201 to 203 from the beam areas 211 to 213. Specifically, the reception analog switch matrix 21 analog-demultiplexes the received signal received from the beam area 211 into a channel A, a channel B, and a channel C. Similarly, the reception analog switch matrix 21 analog-demultiplexes the received signal received from the beam area 212 into a channel D, a channel E, and a channel F, and analog-demultiplexes the received signal received from the beam area 213 into a channel G, a channel H, and a channel I.

In this case, an occupied band of the uplink signal from the beam area 211 is 0.3 (=0.1+0.1+0.1) GHz in total. An occupied band of the uplink signal from the beam area 212 is 0.6 (=0.3+0.2+0.1) GHz in total. An occupied band of the uplink signal from the beam area 213 is 0.1 (=0.0+0.0+0.1) GHz in total. An average use bandwidth per beam in the receiving unit 2 is 0.333 GHz (=1 GHz/3). In this way, it is seen that traffic concentrates on the beam area 212 and traffic is little in the beam area 213. As time elapses, the traffic further becomes uneven. It could be also possible that the use bandwidth of the beam area 212 is 1 GHz and the use bandwidths of the remaining two beam areas 211 and 213 are 0 GHz, the use bandwidth of the beam area 213 is 1 GHz and the use bandwidths of the remaining two beam areas 211 and 212 are 0 GHz, or the use bandwidths of all the beam areas are uniformly 0.333 GHz.

When the use bandwidths in the uplink of the beams change in this way, conventionally, the digital demultiplexing substrates 22 to 24 are designed to have an ability for processing and relaying a band signal of 1 GHz such that data can be relayed even if a use band of maximum 1 GHz occurs in any one beam area. That is, the digital demultiplexing substrates 22 to 24 need to include ultrahigh speed interfaces with the switch matrix unit 3 such that sub-carrier data for maximum 1 GHz can be output to the switch matrix unit 3. This leads to increase in the circuit size and the power consumption of the digital demultiplexing substrates 22 to 24 and increase in the circuit size and the power consumption of the switch matrix unit 3.

On the other hand, in this embodiment, the reception analog switch matrix 21 distributes loads to the three digital demultiplexing substrates 22 to 24. Consequently, the digital demultiplexing substrates 22 to 24 can reduce an amount of sub-carrier data output to the switch matrix unit 3. Note that control for distributing the loads is performed by a control signal from the control station 5 that grasps a communication state and a traffic request of this system.

In this embodiment, the reception analog switch matrix 21 analog-demultiplexes, in predetermined units of channels (0.333 GHz), received signals including unused bands, in which no communication wave is present, from the beam areas and generates the channels A to I. Subsequently, the reception analog switch matrix 21 allocates, on the basis of a control signal from the control station 5, the channels A to I to the digital demultiplexing substrates 22 to 24 such that a total of bands (use bands) of communication waves present in those channels is 0.4 GHz or less. Note that, in the following explanation, the total of the use bands of the demultiplexing substrates is 0.4 GHz or less. However, the present invention is not limited to this.

For example, according to a method explained below, the reception analog switch matrix 21 allocates the channels A to I such that the use band of each of the digital demultiplexing substrates 22 to 24 is 0.4 GHz or less. A total of use band of the channels {A, B, and C} obtained by analog-demultiplexing the received signal from the beam area 211 is 0.3 GHz, which is lower than 0.4 GHz. Therefore, the reception analog switch matrix 21 allocates the channels {A, B, and C} received from the beam area 211 to the digital demultiplexing substrate 22. On the other hand, a total of use bands of the channels {D, E, and F} obtained by analog-demultiplexing the received signal from the beam area 212 is 0.6 GHz, which is higher than 0.4 GHz. A total of use bands of the channels {G, H, and I} obtained by analog-demultiplexing the received signal from the beam area 213 is 0.1 GHz, which is lower than 0.4 GHz. Therefore, the reception analog switch matrix 21 allocates loads of the channels {D, E, F, G, H, and I} to be distributed to the digital demultiplexing substrate 23 and the digital demultiplexing substrate 24. That is, the reception analog switch matrix 21 allocates {D, G, and H} (0.3 GHz in total) to the digital demultiplexing substrate 23 and allocates {E, F, and I} (0.4 GHz in total) to the digital demultiplexing substrate 24 to set a total of the use band of each of the digital demultiplexing substrates to 0.4 GHz or less.

Note that, in the above explanation, the total use band of the three beams is 1 GHz. However, the present invention is not limited to this. For example, the total use bands of the three beams can be 0.8 GHz.

Subsequently, after AD-converting the channel A, the demultiplexing unit 221 of the digital demultiplexing substrate 22 demultiplexes the channel A into a plurality of sub-channels. Similarly, after AD-converting the channel B, the demultiplexing unit 222 demultiplexes the channel B into a plurality of sub-channels. After AD-converting the channel C, the demultiplexing unit 223 demultiplexes the channel C into a plurality of sub-channels. After AD-converting signals in the bandwidth of 0.333 GHz, the demultiplexing units 221 to 223 demultiplex the signals into a plurality of sub-channels. However, in the example shown in FIG. 2, because each of the use bands of {A, B, and C} is 0.1 GHz, the signal of 0.1 GHz in the sub-channels obtained by the demultiplexing is a significant signal that should be relayed. The signal of the remaining 0.233 (=0.333−0.1) GHz becomes a meaningless signal equivalent to a free band. The significant signal refers to a signal that is actually present and needs to be relayed.

When the digital demultiplexing substrates 22 to 24 output all of the sub-channels obtained by the demultiplexing to the switch matrix unit 3, a transmission band thereof reaches 1 GHz in total. However, in this embodiment, the switch unit 224 selects only the sub-channel in which the significant signal is present out of a plurality of sub-channels output from the demultiplexing units 221 to 223 and outputs the sub-channel to the switch matrix unit 3.

Specifically, the switch unit 224 selects a significant signal of 0.1 GHz from the channel A demultiplexed into a plurality of sub-channels output from the demultiplexing unit 221 and outputs the signal. Similarly, the switch unit 224 selects a significant signal of 0.1 GHz from the channel B demultiplexed into a plurality of sub-channels output from the demultiplexing unit 222 and outputs the signal. Similarly, the switch unit 224 selects a significant signal of 0.1 GHz from the channel C demultiplexed into a plurality of sub-channels output from the demultiplexing unit 223 and outputs the signal. Note that control of the switches 224, 234, and 244 is performed by a control signal from the control station 5 that grasps a communication state and a traffic request of this system. According to this processing, the digital demultiplexing substrate 22 can reduce a transmission band of the digital demultiplexing substrate 22 from 1 GHz to 0.3 GHz (=3×0.1 GHz). Similarly, according to a selection function of the switch units 234 and 244, a transmission band of the digital demultiplexing substrate 23 can be reduced from 1 GHz to 0.3 GHz and a transmission band of the digital demultiplexing substrate 24 can be reduced from 1 GHz to 0.4 GHz.

Note that, because no significant signal is present in the channels {G and H}, it can be arranged such that the reception analog switch matrix 21 does not input data of the channels {G and H} to the digital demultiplexing substrate 23, and the demultiplexing units 232 and 233 are controlled to stop operating. In this case, it is made possible to realize a reduction in the power consumption of the receiving unit.

In the above explanation, the receiving unit 2 is provided in the relay apparatus 1. However, the receiving unit 2 can also be applied to a receiving unit of a radio base station of a ground system that receives signals from a plurality of areas by a plurality of antennas. In a processing flow of this case, the radio base station digital-multiplexes a plurality of significant sub-channels obtained by the receiving unit 2 into a plurality of signals necessary for demodulation and restores the signals, and thereafter demodulates the signals. In this case as well, data transmission speed between the digital demultiplexing substrates 22 to 24 and the digital multiplexing substrates 42 to 44, which demodulate signals, operating speed and processing amount of each of the substrates can be reduced. Therefore, it is made possible to realize a reduction in the size and a reduction in the power consumption of the radio base station.

As explained above, in the receiving unit 2, the reception analog switch matrix 21 distributes the received signals to the digital demultiplexing substrates 22 to 24 within the range of the predetermined use band. Therefore, it is possible to make processing bands of the digital demultiplexing substrates 22 to 24 uniform. The digital demultiplexing substrates 22 to 24 are controlled so as to select only the significant signals from the sub-channels after the demultiplexing and output the significant signals. Therefore, it is possible to reduce a transmission band of data transmitted from the digital demultiplexing substrates 22 to 24.

Note that, even when the reception analog switch matrix 21 is not set, by controlling the digital demultiplexing substrates 22 to 24 to select and output only the significant signals, it is made possible to reduce a transmission band of data transmitted from the digital demultiplexing substrates 22 to 24 to the switch matrix unit 3.

<Operation on the Transmission Side>

Figure 3:
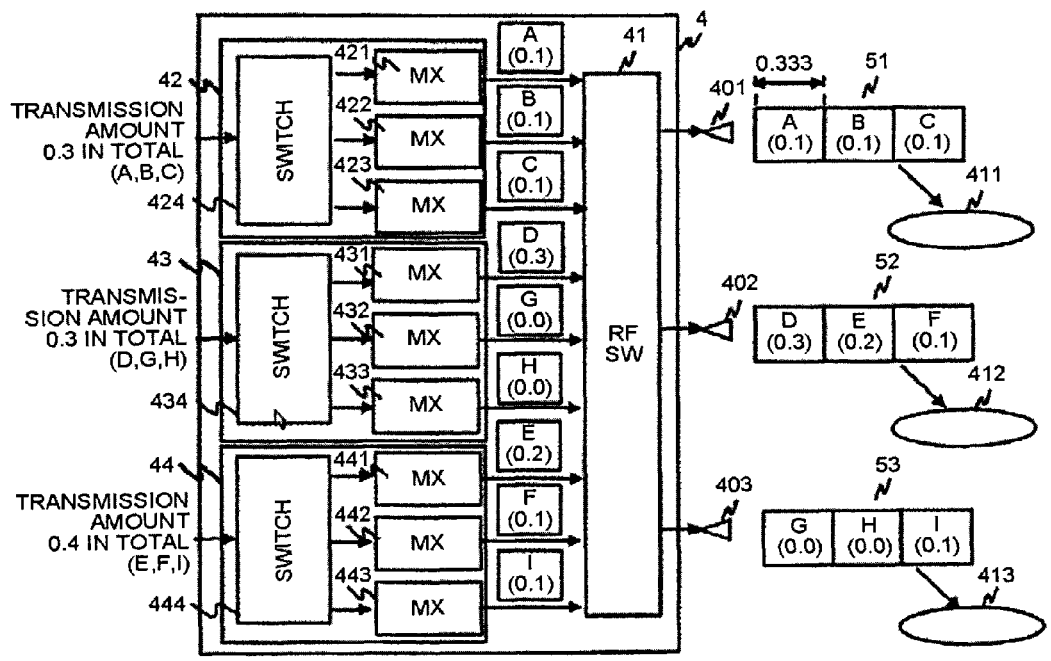
FIG. 3 is a diagram showing a component (a transmitting unit) of the relay apparatus in the first embodiment.

The operation of the transmitting unit 4 in the relay apparatus 1 is explained with reference to FIG. 3. The transmitting unit 4 includes a transmission analog switch matrix (an analog multiplexing unit) 41 and digital multiplexing substrates (digital multiplexing units) 42 to 44. The digital multiplexing substrate 42 includes multiplexing units 421 to 423 and a digital switch unit 424. The digital multiplexing substrate 43 includes multiplexing units 431 to 433 and a digital switch unit 434. The digital multiplexing substrate 44 includes multiplexing units 441 to 443 and a digital switch unit 444. Spectra 51 to 53 are general ideas for each spectrum of downlink signals to the beam areas 411 to 413. Alphabets A to I described in the spectra 51 to 53 indicate channel names for each frequency bandwidth (0.333 GHz). Numbers in parentheses indicate, in a GHz unit, signal bandwidths used in relevant channels.

In the following explanation, a maximum use bandwidth of one beam area is assumed to be 1 GHz. In the following explanation, an occupied band of a downlink signal to the beam area 411 is 0.3 (=0.1+0.1+0.1) GHz in total as indicated by the spectrum 51. An occupied band of a downlink signal to the beam area 412 is 0.6 (=0.3+0.2+0.1) GHz in total as indicated by the spectrum 52. An occupied band of a downlink signal from the beam area 413 is 0.1 (=00+00+ 0.1) GHz in total as indicated by the spectrum 53. An average use bandwidth per beam is 0.333 GHz (=1 GHz/3).

In this embodiment, traffic concentrates on the beam area 412. Traffic is little in the beam area 413. However, in the downlink, as in the uplink, as time elapses, the use bandwidths change between 0 GHz to 1 GHz.

When the use bandwidths in the uplink of the beams change in this way, conventionally, the digital multiplexing substrates 42 to 44 need to have an ability for processing and relaying a band signal of 1 GHz such that data can be relayed even if a use band of maximum 1 GHz occurs in any one beam area. That is, the digital multiplexing substrates 42 to 44 need to include ultrahigh speed interfaces with the switch matrix unit 3 such that sub-channel data for maximum 1 GHz input from the switch matrix unit 3 can be output to the transmission analog switch matrix 41. This leads to increase in the circuit size and the power consumption of the digital multiplexing substrates 42 to 44 and increase in the circuit size and the power consumption of the switch matrix unit 3.

In this embodiment, the switch matrix unit 3 distributes significant sub-channel data forming the channels A to I to the digital multiplexing substrates 42 to 44 such that a bandwidth processed by the digital multiplexing substrates 42 to 44 in advance becomes 0.4 GHz or less in total. The digital multiplexing substrates 42 to 44 generate desired channels A to I using the significant sub-channel data input from the switch matrix unit 3 and empty data generated inside and output the channels A to I to the transmission analog switch matrix 41. Subsequently, the transmission analog switch matrix 41 selects three sub-channel data from each of the channels A to I generated by the digital multiplexing substrates 42 to 44 and analog-multiplexes the sub-channels to form spectra corresponding to original requested traffic. Control for distributing loads of the digital multiplexing substrates 42 to 44 is performed by a control signal from the control station 5 that grasps a communication state and a traffic request of this system.

Specifically, the switch matrix unit 3 inputs sub-channel data equivalent to the channels {A, B, and C}, a bandwidth of which is 0.3 GHz and 0.4 GHz or less in total, to the digital multiplexing substrate 42. The digital switch 424 of the digital multiplexing substrate 42 allocates, to each of the channels, the sub-channel data equivalent to the channels {A, B, and C} input from the switch matrix unit 3. The digital switch 424 outputs sub-channel data (having a bandwidth of 0.1 GHz) concerning the channel A to the multiplexing unit 421, outputs sub-channel data (having a bandwidth of 0.1 GHz) concerning the channel B to the multiplexing unit 422, and outputs sub-channel data (having a bandwidth of 0.1 GHz) concerning the channel C to the multiplexing unit 423. The multiplexing unit 421 multiplexes the input sub-channel data and empty data equivalent to an empty band generated inside the multiplexing unit 421 and generates the channel data A. Similarly, the multiplexing unit 422 generates the channel data B and the multiplexing unit 423 generates the channel data C. The switching operations of the switches 424, 434, and 444 are performed by a control signal from the control station 5.

Similarly, the switch matrix unit 3 outputs sub-channel data equivalent to the channels {D, G, and H}, a bandwidth of which is 0.3 GHz in total, to the digital multiplexing substrate 43. The switch 434 and multiplexing units 431 to 433 of the digital multiplexing substrate 43 generate the channel data D (having a bandwidth of 0.3 GHz), the channel data G (having a bandwidth of 0.0 GHz), and the channel data H (having a bandwidth of 0.0 GHz). Note that no significant signal is present in the channels {G and H}. Therefore, it can be arranged such that the switch matrix unit 3 does not input sub-channel data equivalent to the channels {G and H} to the digital multiplexing substrate 43, and the multiplexing units 432 and 433 are controlled so as to stop operating. In this case, it is possible to realize a reduction in the power consumption of the transmitting unit. Similarly, the switch matrix unit 3 outputs sub-channel data equivalent to the channels {E, F, and I}, the bandwidth of which is 0.4 GHz in total, to the digital multiplexing substrate 44. The digital switch 444 and multiplexing units 441 to 443 of the digital multiplexing substrate 44 generate the channel data E (having a bandwidth of 0.2 GHz), the channel data F (having a bandwidth of 0.1 GHz), and the channel data I (having a bandwidth of 0.1 GHz).

The transmission analog switch matrix 41 allocates the input channels A to I to beam areas and frequencies of desired transmission destinations. The allocating operation to the beams and the frequencies is performed by a control signal from the control station 5.

Note that the transmitting unit 4 can be applied not only to the relay apparatus 1 in this embodiment but also a transmitting unit of a radio base station of a ground system that receives, with a plurality of antennas, signals from a plurality of areas. In this case, the radio base station is configured to, after demultiplexing, in units of sub-channels, a plurality of transmission signals generated by another modulation substrate, distribute the channels A to I and connect the channels A to I to the digital multiplexing substrates 42 to 44 such that a bandwidth processed by the digital multiplexing substrates 42 to 44 becomes 0.4 GHz or less in total. In this case as well, data transmission speed between the digital multiplexing substrates 42 to 44 and the modulation substrate and processing amounts and operating speeds of the substrates can be reduced. Therefore, it is made possible to realize a reduction in the size and a reduction in the power consumption of the radio base station.

In this embodiment, even when the bands used in communication in the beam areas in the uplink and the downlink are non-uniform, the processing amounts of the digital demultiplexing substrates 22 to 24 and the digital multiplexing substrates 42 to 44 are controlled so as not to be uneven. However, even if there is only one beam area in each of the uplink and the downlink, it is possible to control the processing amounts of the digital demultiplexing substrates 22 to 24 and the digital multiplexing substrates 42 to 44 not to be uneven. For example, when there is one beam area in each of the uplink and the downlink, the channels A to I shown in FIG. 2 are input to the reception analog switch matrix 21 side by side in a frequency axis direction via one antenna. Even in this case, in the receiving unit 2, the reception analog switch matrix 21 controls the channels A to I, use bands of which are non-uniform in the frequency axis direction, to be distributed to the digital demultiplexing substrates 22 to 24. Consequently, the reception analog switch matrix 21 can control the processing amounts of the digital demultiplexing substrates 22 to 24 not to be uneven. The same applies to the transmitting unit 4. The transmitting unit 41 can transmit the channels A to I, which are input to the transmission analog switch matrix 41, to one beam area via one antenna.

Figure 4:
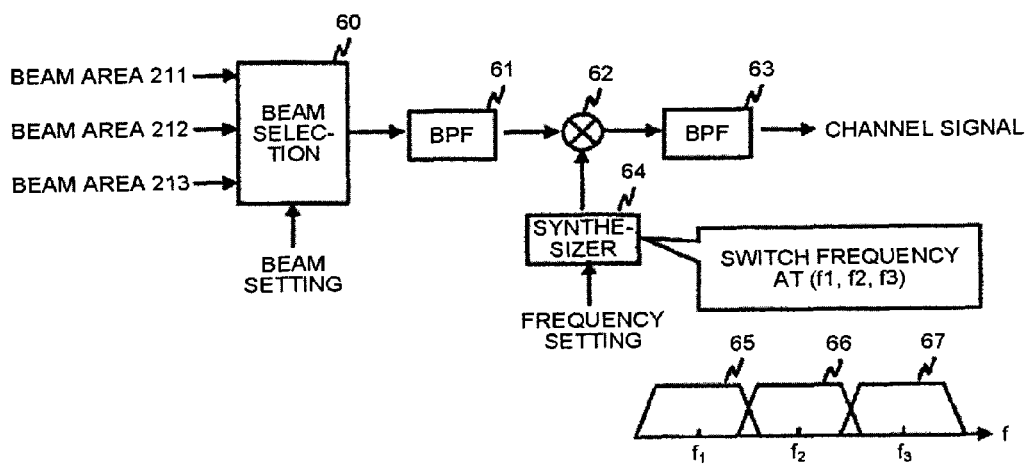
FIG. 4 is a diagram showing a configuration example of a reception analog switch matrix 21.

The reception analog switch matrix 21 and the transmission analog switch matrix 41 can be easily realized by, for example, a beam selection circuit and a frequency synthesizer. The reception analog switch matrix 21 shown in FIG. 4 extracts any one channel out of the channels A to I. The reception analog switch matrix 21 includes a beam selection circuit 60, a band-pass filter (BPF) 61, an analog multiplier 62, a band-pass filter (BPF) 63, and a frequency synthesizer 64.

The beam selection circuit 60 selects a signal of one beam area from input signals of the three beam areas 211 to 213 and outputs the signal to the band-pass filter (BPF) 61. The band-pass filter 61 removes components outside of a system band. For example, when extracting the channel F, the beam selection circuit 60 selects a signal of the beam area 212. The signals {D, E, and F} are extracted through the BPF 61. Further, when selecting the channel F from the signals {D, E, and F}, the frequency synthesizer 64 generates a local signal having a frequency ($f_3$) corresponding to the channel F. The analog multiplier 62 multiplies together the signals {D, E, and F} and the local signal. In this way, a center frequency of the channel F can be converted into a desired frequency. The band-pass filter (BPF) 63 at the last stage extracts only a band (67) of the channel F converted into the desired frequency and removes a high-frequency component and the adjacent wave components D and E. Similarly, when extracting the channel D from the signals {D, E, and F}, the frequency synthesizer 64 generates a local signal having a frequency ($f_1$) corresponding to the channel D and extracts only a band (65) of the channel D converted into the desired frequency. When extracting the channel E, the frequency synthesizer 64 generates a local signal having a frequency ($f_2$) corresponding to the channel E and extracts only a band (66) of the channel E converted into the desired frequency.

Figure 5:
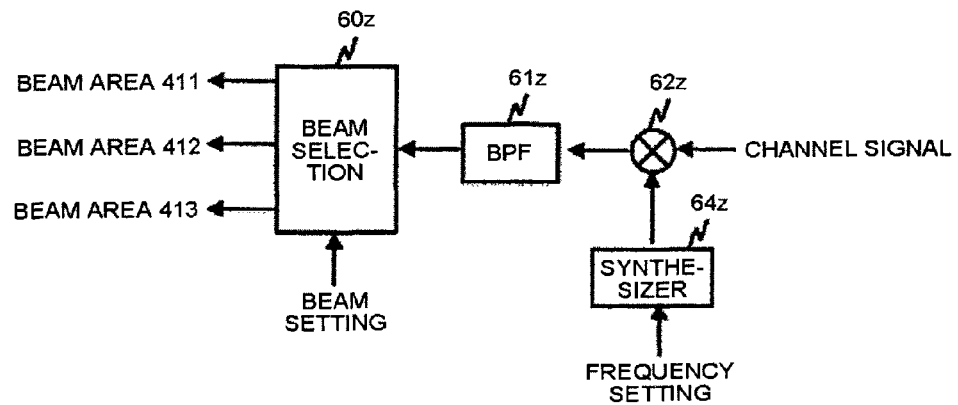
FIG. 5 is a diagram showing a configuration example of a transmission analog switch matrix 41.

As shown in FIG. 5, the transmission analog switch matrix 41 can include a beam selection circuit 60z, a band-pass filter (BPF) 61z, a mixer 62z, and a frequency synthesizer 64z. The transmission analog switch matrix 41 can be realized by the frequency synthesizer 64z and the beam selection circuit 60z like the reception analog switch matrix 21 except that a flow of signal processing is opposite. In this case, a transmission channel is converted into any one of three frequencies by being multiplied with a local signal (a center frequency $\in \{f_1', f_2', f_3'\}$) output from the frequency synthesizer 64z and thereafter removing an unnecessary component in the band-pass filter (BPF) 61z. Thereafter, the transmission channel is transmitted to a desired beam area by the beam selection circuit 60z.

In the first embodiment, the functional blocks are grouped and represented by the name of substrates. However, each of the groups does not always need to be configured by one substrate. For example, a plurality of groups can be present on one substrate. Further, each group can be configured by anything other than a substrate as long as it is regarded as being grouped. For example, one substrate can be one integrated circuit {FPGA, ASIC, etc.}.

According to the operation explained above, while the switch matrix 3 in this embodiment suppresses the band of the transmission data to be input to the digital multiplexing substrates 42 to 44 to 0.4 GHz or less, the transmission analog switch matrix 41 can realize spectrum transmission described in the spectra 51 to 53. While the switch matrix 3 suppresses the band of the transmission data to be input to each of the digital multiplexing substrates 42 to 44, the transmission analog switch matrix 41 can two-dimensionally freely dispose each of the channels to an area and a frequency according to traffic fluctuation. The switch matrix unit 3 can distributes transmission signals such that processing bands are as uniform as possible with respect to the digital multiplexing substrates 42 to 44. The transmission analog switch matrix 41 can apply control for distributing the channels generated by the digital multiplexing substrates 42 to 44 to beam areas and frequencies according to traffic fluctuation. Consequently, the transmitting unit 4 in this embodiment can reduce bands of data input to the digital multiplexing substrates 42 to 44. According to the reduction of the data band between the transmitting unit 4 and the switch matrix unit 3, the transmitting unit 4 reduces the circuit size and the power consumption of the digital multiplexing substrates 42 to 44 and reduces the circuit size and the power consumption of the switch matrix unit 3.

Note that, even when the transmission analog switch matrix 41 is not disposed, by controlling the switch matrix unit 3 to distribute the transmission signals such that the processing bands are made as uniform as possible with respect to the digital multiplexing substrates 42 to 44, an effect of suppressing transmission bands of data transmitted from the switch matrix unit 3 to the digital multiplexing substrates 42 to 44 is obtained.

Second Embodiment

In the following explanation in a second embodiment, a degree of setting of beams and frequencies of the reception analog switch matrix 21 and the transmission analog switch matrix 41 in the first embodiment is suppressed and a circuit size is reduced. Explanation is omitted concerning portions common to the first embodiment.

Figure 2:
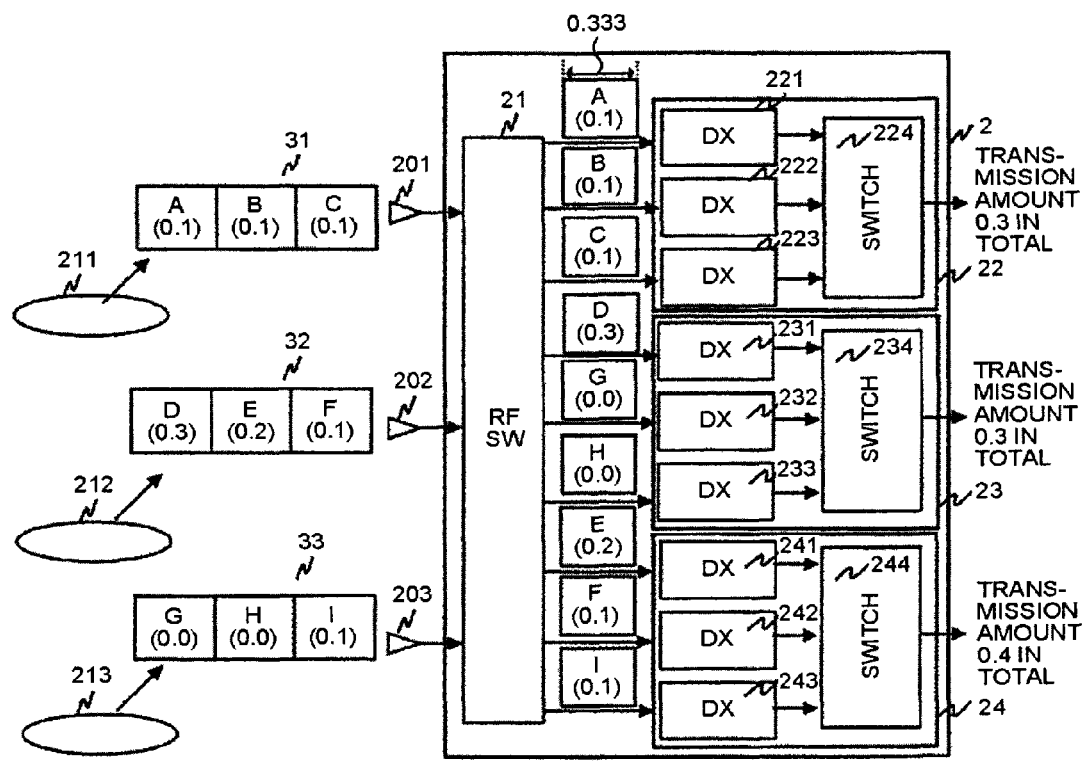
FIG. 2 is a diagram showing a component (a receiving unit) of the relay apparatus in the first embodiment.

Referring to FIG. 2 as an example, the channels {A, B, and C} are connected to not all of the demultiplexing units (221 to 223, 231 to 233, and 241 to 243) but are limitedly connected to three demultiplexing units (221, 231, and 241). Specifically, the channel A is connected to the demultiplexing unit 221, the channel B is connected to the demultiplexing unit 231, and the channel C is connected to the demultiplexing unit 241. Similarly, the channels {D, E, and F} are limitedly connected to three demultiplexing units {222, 232, and 242}, and the channels {G, H, and I} are limitedly connected to the demultiplexing units {223, 233, and 243}. According to this limitation, it is made possible to reduce the circuit size of the reception analog switch matrix 21. Even when traffic concentrates on a certain beam area, the traffic is distributed to the three digital demultiplexing substrates. Therefore, reduction effects of data transmission speed among the digital substrates and operation speed and processing amount of the substrates are obtained.

Figure 6:
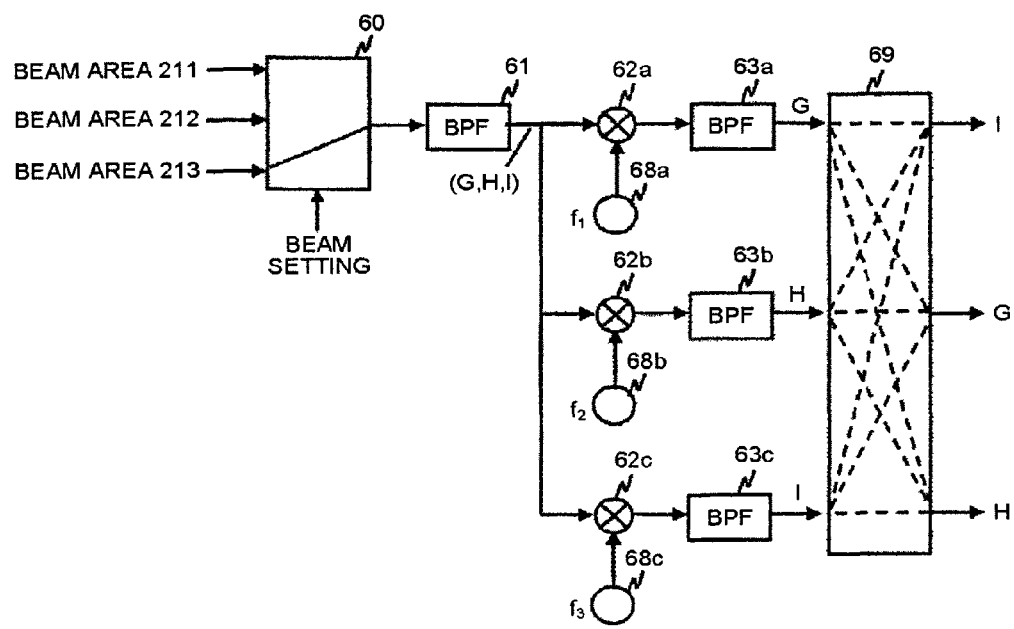
FIG. 6 is a diagram showing a configuration example of the reception analog switch matrix 21.

FIG. 6 is a circuit configuration diagram of the reception analog switch matrix 21 in this embodiment. This circuit has a smaller circuit size compared with the circuit configuration shown in FIG. 4. In FIG. 6, after extracting a signal in a desired beam area in the beam selection circuit 60 and the BPF 61, the reception analog switch matrix 21 separates adjacent three channels with local signals having three frequencies $\{f_1, f_2, \text{ and } f_3\}$. After the separation of the channels, the three channels are connected to desired three demultiplexing units by a 3-to-3 analog switch matrix 69.

For example, when the beam selection circuit 60 selects a received signal from the beam area 213, the channels {G, H, and I} are output from the BPF 61. Thereafter, a frequency converter configured by a local oscillator 68a having the frequency f1, a mixer 62a, and a BPF 63a extracts the channel G from {G, H, and I}. Similarly, a frequency converter configured by a local oscillator 68b having the frequency f2, a mixer 62b, and a BPF 63b extracts the channel H. A frequency converter configured by a local oscillator 68c having the frequency f3, a mixer 62c, and a BPF 63c extracts the channel I.

Subsequently, the 3-to-3 analog switch matrix 69 connects the extracted channels G, H, and I to any one of the demultiplexing units 223, 233, and 243 on the basis of a control signal from the control station 5. In FIG. 5, inputs {I, G, and I} are rearranged into outputs {I, G, and H} and output by the 3-to-3 analog switch matrix 69.

Note that, in FIG. 6, a reception analog switch matrix circuit exclusive for the beam area 213 can be formed by deleting the beam selection circuit 60 and directly inputting a signal from the beam area 213. In this case, the reception analog switch matrix 21 can be realized by three reception analog switch matrixes, i.e., the reception analog switch matrix circuit exclusive for the beam area 213, a reception analog switch matrix circuit exclusive for the beam area 211, and a reception analog switch matrix circuit exclusive for the beam area 212.

If the local oscillators 68a, 68b, and 68c are shared by the three reception analog switch matrix circuits exclusive for the beam areas 211 to 213, the circuit size can be further reduced.

By limiting connection between the multiplexing units and the channels, the circuit size of the transmission analog switch matrix 41 can be reduced. For example, in FIG. 3, three outputs of the multiplexing units {421, 431, and 441} are limited to be connected to only one of three frequencies in the beam area 411. Similarly, three outputs of the multiplexing units {422, 432, and 442} are limited to be connected to only one of three frequencies in the beam area 412, and three outputs of the multiplexing units {423, 433, and 443} are limited to be connected to only one of three frequencies in the beam area 413.

Figure 7:
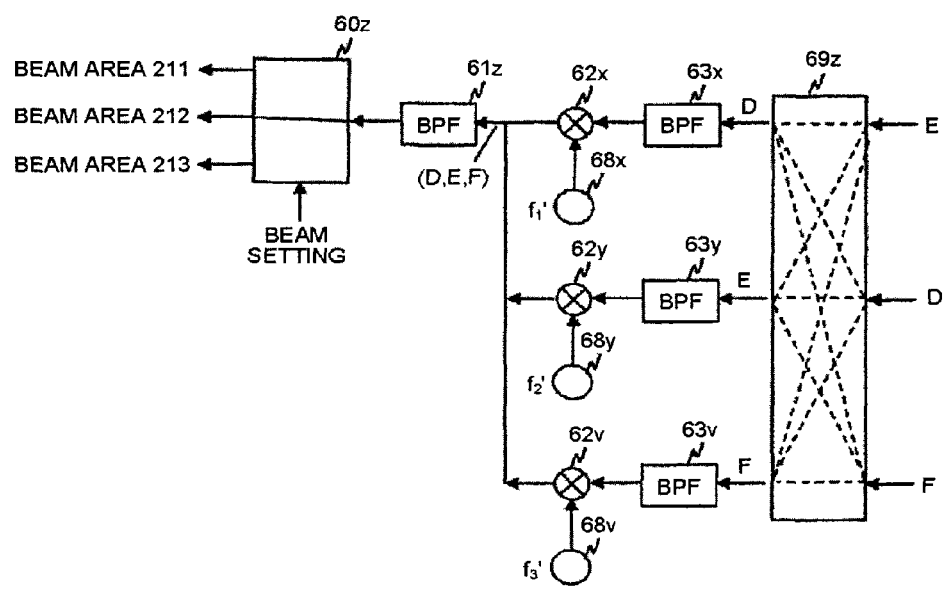
FIG. 7 is a diagram showing a configuration example of the transmission analog switch matrix 41.

A configuration example concerning the transmission analog switch matrix 41 in which the connection of the outputs are limited as explained above is shown in FIG. 7. In FIG. 7, a 3-to-3 analog switch matrix 69z arranges the channels {E, D, and F} output from the three multiplexing units on a frequency axis as {D, E, and F} and then transmits the channels from the beam area 412.

Thereafter, the channel D is converted into a radio frequency by a frequency converter configured by a local oscillator 68x having a frequency $f_1'$, a mixer 62x, and a BPF 63x. Similarly, the channel E is converted into a radio frequency by a frequency converter configured by a local oscillator 68y having a frequency $f_2'$, a mixer 62y, and a BPF 63y, and the channel F is converted into a radio frequency by a frequency converter configured by a local oscillator 68v having a frequency $f_3'$, a mixer 62v, and a BPF 63v. The channels converted into the radio frequencies are arranged on the frequency axis as {D, E, and F} after unnecessary waves are removed by the BPF 61z. The beam selection circuit 60z performs connection control for transmitting an output of the BPF 61z to the beam area 412.

Note that, in FIG. 7, a transmission analog switch matrix circuit exclusive for the beam area 412 can be formed by deleting the beam selection circuit 60z and directly outputting a signal to the beam area 412. In this case, similarly, the transmission analog switch matrix 41 can be realized by three transmission analog switch matrix circuits, i.e., the transmission analog switch matrix circuit exclusive for the beam area 412, a transmission analog switch matrix circuit exclusive for the beam area 411, and a transmission analog switch matrix circuit exclusive for the beam area 413. If the local oscillators 68x, 68y, and 68z are shared by the three transmission analog switch matrix circuits exclusive for the beam areas 411 to 413, the circuit size can be further reduced.

In this embodiment, the functional blocks are grouped and represented by the name of substrates. However, each of the groups does not always need to be configured by one substrate. For example, a plurality of groups can be present on one substrate. Further, each group can be configured by anything other than a substrate as long as it is regarded as being grouped. For example, one substrate can be one integrated circuit {FPGA, ASIC, etc.}.

Third Embodiment

In this embodiment, a temporary demultiplexing unit (not shown in the figure) and a temporary multiplexing unit (not shown in the figure) that temporarily process signals are provided in the relay apparatus 1 explained in the first and second embodiments. Even if the transmission and reception analog switch matrixes 21 and 41 perform distributed control, the amount of use of frequency in each of the beam areas changes according to the elapse of time, and thus, connection switching in the transmission and reception analog switch matrixes 21 and 41 is made necessary again. The temporary demultiplexing unit and the temporary multiplexing unit cope with instantaneous interruption of a communication wave that occurs when the connection switch is performed.

For example, in FIG. 2, when a use band of the channel D decreases from 0.3 GHz to 0.1 GHz and, on the other hand, a use band of the channel A increases from 0.1 GHz to 0.3 GHz, a signal band output by the digital demultiplexing substrate 23 decreases from 0.3 GHz to 0.1 GHz and, on the other hand, a signal band output by the digital demultiplexing substrate 22 increases from 0.3 GHz to 0.5 GHz and exceeds a set upper limit 0.4 GHz. In this case, the reception analog switch matrix 21 can suppress the outputs of the digital demultiplexing substrates to the upper limit 0.4 GHz or less by performing control for switching connection of the channel D from the demultiplexing unit 231 to the demultiplexing unit 221 and switching connection of the channel A from the demultiplexing unit 221 to the demultiplexing unit 231. However, when the reception analog switch matrix 21 switches the connection, communication waves are instantaneously interrupted and communication is cut off once.

For example, the reception analog switch matrix 21 performs control for realizing non-instantaneous interruption in switching connection of the channel D from the demultiplexing unit 231 to the demultiplexing unit 331 and switching connection of the channel A from the demultiplexing unit 221 to the demultiplexing unit 231. The control is explained below.

(Step 1) The reception analog switch matrix 21 connects the channel D to the demultiplexing unit 231 and, at the same time, connects the channel D to the temporary demultiplexing unit that temporarily processes a signal.

(Step 2) In the beginning, concerning data of the channel D input from both of the demultiplexing unit 231 and the temporary demultiplexing unit, the switch matrix unit 3 selects the data of the channel D input from the demultiplexing unit 231 and transmits the data to the transmitting unit 4. However, at a fixed timing, the switch matrix unit 3 switches the data input from the demultiplexing unit 231 to the data of the channel D input from the temporary demultiplexing unit. In general, sub-channel data demultiplexed by the digital demultiplexing substrate is time-multiplexed and sent to the switch matrix unit 3. Therefore, a data format is framed. Accordingly, as the switching timing of the selection, the data is switched in units of data frames, and consequently, it is made possible to avoid a lack of data and instantaneous interruption.

(Step 3) The reception analog switch matrix 21 releases the connection to the demultiplexing unit 231 and connects the channel D to only the temporary demultiplexing unit.

(Step 4) The reception analog switch matrix 21 connects the channel A to the demultiplexing unit 221 and, at the same time, connects the channel A to the demultiplexing unit 231.

(Step 5) Concerning data of the channel A input from both of the demultiplexing unit 231 and the demultiplexing unit 221, the switch matrix unit 3 switches selection of the data of the channel A input from the demultiplexing unit 221 to selection of the data of the channel A input from the demultiplexing unit 231 at a fixed timing. As the switching timing of the selection, the selection of the data is switched in units of data frames to avoid a lack of data and instantaneous interruption.

(Step 6) The reception analog switch matrix 21 releases the connection to the demultiplexing unit 221 and connects the channel A to only the demultiplexing unit 231.

(Step 7) The reception analog switch matrix 21 connects the channel D to the temporary demultiplexing unit and, at the same time, connects the channel D to the demultiplexing unit 221.

(Step 8) Concerning data of the channel D input from both of the temporary demultiplexing unit and the demultiplexing unit 221, the switch matrix unit 3 switches selection of the data of the channel A input from the temporary demultiplexing unit to selection of the data of the channel A input from the demultiplexing unit 221 at a fixed timing. As the switching timing of the selection, the selection of the data is switched in units of data frames to avoid a lack of data and instantaneous interruption.

(Step 9) The reception analog switch matrix 21 releases the connection to the temporary demultiplexing unit and connects the channel A to only the demultiplexing unit 221.

According to this operation, it is possible to avoid communication interruption that occurs in the connection switching by the reception analog switch matrix 21.

The same operation is applied to connection switching by the switch matrix unit 3 as well. For example, in FIG. 3, when a use band of the channel D decreases from 0.3 GHz to 0.1 GHz and, on the other hand, a use band of the channel A increases from 0.1 GHz to 0.3 GHz, a signal band input to the digital multiplexing substrate 43 decreases from 0.3 GHz to 0.1 GHz and, on the other hand, a signal band input to the digital multiplexing substrate 42 increases from 0.3 GHz to 0.5 GHz and exceeds the set upper limit 0.4 GHz.

In this case, the switch matrix unit 3 can suppress the outputs of the digital substrates to the upper limit 0.4 GHz by performing control for switching connection of the channel D from the multiplexing unit 431 to the multiplexing unit 421 and switching connection of the channel A from the multiplexing unit 421 to the multiplexing unit 431. However, there remains a problem in that, when the transmission analog switch matrix 41 simply switches the connection, communication waves are instantaneously interrupted and communication is cut off once. In this case, for example, it is possible to avoid temporary communication interruption by providing a temporary multiplexing unit that temporarily processes a signal and switching connection according to the procedure explained below.

(Step 1) The switch matrix unit 3 connects the channel D to the multiplexing unit 431 through the switch 434 and, at the same time, connects the channel D to the temporary multiplexing unit that temporarily processes a signal.

(Step 2) The temporary multiplexing unit starts multiplexing processing of the channel D and discards multiplexed data after the processing without outputting the multiplexed data.

(Step 3) The transmission analog switch matrix 41 combines an output of the temporary multiplexing unit with an output of the multiplexing unit 431 and outputs the combined output to the antenna 402. However, because only the channel D from the multiplexing unit 431 is output, this is substantially equal to selection and output of the channel D from the multiplexing unit 431.

(Step 4) At a fixed timing, the transmission analog switch matrix 41 starts transmission of the channel D from the temporary multiplexing unit and, at the same time, stops the transmission of the channel D from the multiplexing unit 431. It is possible to avoid a lack of data and instantaneous interruption by switching the timing in units of data frames input to the multiplexing units. The transmission analog switch matrix 41 still combines the output of the temporary multiplexing unit with the output of the multiplexing unit 431. However, this is substantially equal to the selection and output of the channel D from the temporary multiplexing unit.

(Step 5) The switch matrix unit 3 releases the connection of the channel D connected to the multiplexing unit 431 through the switch 434.

(Step 6) The switch matrix unit 3 connects the channel A to the multiplexing unit 421 through the switch 424 and, at the same time, connects the channel A to the multiplexing unit 431 through the switch 434.

(Step 7) The multiplexing unit 431 starts multiplexing processing of the channel A and discards multiplexed data after the processing without outputting the multiplexed data yet.

(Step 8) The transmission analog switch matrix 41 combines an output of the multiplexing unit 431 with an output of the multiplexing unit 421 and outputs the combined output to the antenna 402. However, at this point, because only the channel A from the multiplexing unit 421 is output, this is substantially equal to selection and output of the channel A from the multiplexing unit 421.

(Step 9) At a fixed timing, the transmission analog switch matrix 41 starts transmission of the channel A from the multiplexing unit 431 and, at the same time, stops the transmission of the channel A from the multiplexing unit 421. It is possible to avoid a lack of data and instantaneous interruption by switching the timing in units of data frames input to the multiplexing units. The transmission analog switch matrix 41 still combines the output of the multiplexing unit 431 with the output of the multiplexing unit 421. However, this is equal to the selection and output of the channel A from the temporary multiplexing unit 431.

(Step 10) The switch matrix unit 3 releases the connection of the channel A connected to the multiplexing unit 421 through the switch 424.

(Step 11) The switch matrix unit 3 connects the channel D to the temporary multiplexing unit and, at the same time, connects the channel D to the multiplexing unit 421 through the switch 424.

(Step 12) The multiplexing unit 421 starts multiplexing processing of the channel D and discards multiplexed data after the processing without outputting the multiplexed data yet.

(Step 13) The transmission analog switch matrix 41 combines an output of the multiplexing unit 421 with an output of the temporary multiplexing unit and outputs the combined output to the antenna 401. However, at this point, because only the channel D from the temporary multiplexing unit is output, this is substantially equal to selection and output of the channel D from the temporary multiplexing unit.

(Step 14) At a fixed timing, the transmission analog switch matrix 41 starts transmission of the channel D from the multiplexing unit 421 and, at the same time, stops the transmission of the channel D from the temporary multiplexing unit. It is possible to avoid a lack of data and instantaneous interruption by switching the timing in units of data frames input to the multiplexing units. The transmission analog switch matrix 41 still combines the output of the multiplexing unit 421 with the output of the temporary multiplexing unit. However, this is equal to the selection and output of the channel D from the multiplexing unit 421.

(Step 15) The switch matrix unit 3 releases the connection of the channel D connected to the temporary multiplexing unit.

In this way, it is made possible to avoid communication interruption that occurs in the connection switching by the transmission analog switch matrix.

Fourth Embodiment

In this embodiment, the circuit explained in the first to third embodiments is further reduced in size. Differences from the first to third embodiments are explained below.

Figure 8:
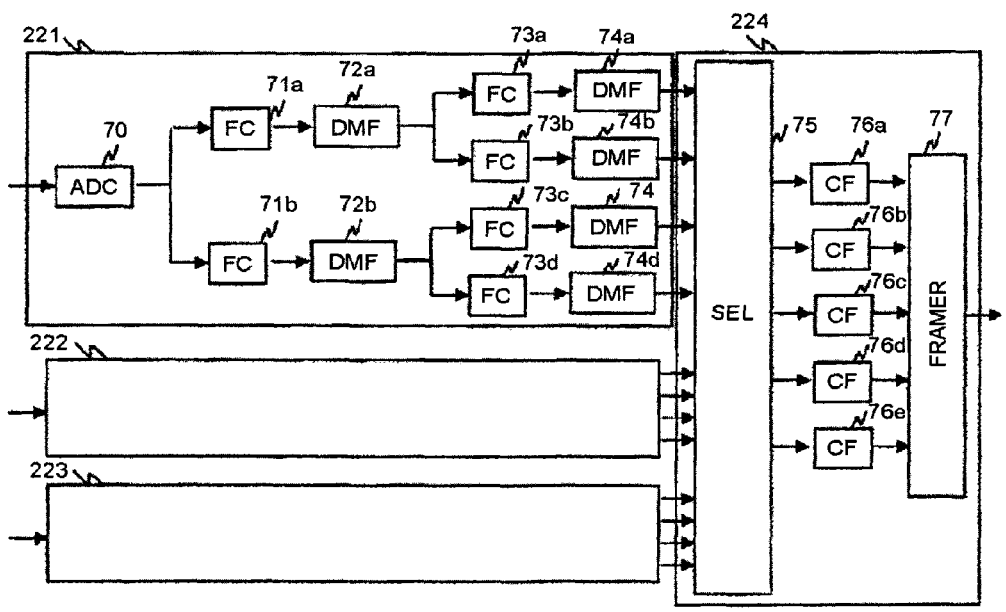
FIG. 8 is a diagram showing a configuration example of a digital demultiplexing substrate.

FIG. 8 shows a functional block diagram of the digital demultiplexing substrate 22 in the fourth embodiment. The digital demultiplexing substrate 22 includes an analog digital converter (ADC) 70, frequency converters (FCs) 71a and 71b and 73a to 73d, a ½ decimation filters (DMF) 72a and 72b and 74a to 74d, a selector (SEL) 75, channel filters (CFs) 76a to 76e, and a framer 77. For this demultiplexing system, a tree system for dividing a band into two stepwise is applied. The demultiplexing unit 221 indicates, for example, a configuration for demultiplexing a channel A signal into four sub-channels. Note that, in FIG. 8, the demultiplexing unit 222 and the demultiplexing unit 223 have a configuration same as the configuration of the demultiplexing unit 221. Therefore, description of the configuration of the demultiplexing unit 222 and the demultiplexing unit 223 is omitted.

In the demultiplexing unit 221, a spectrum of an input signal is demultiplexed into four by a tree configured by the frequency converters (FCs) 71 and 73 and the ½ decimation filters (DMFs) 72 and 74. That is, at a first stage, a right half of the spectrum of the input signal is extracted by {the FC 71a and the DMF 72a} and a left half of the spectrum of the input signal is extracted by {the FC 71b and the DMF 72b}. At this point, the spectrum of the input signal is demultiplexed into two.

Subsequently, the demultiplexed spectrum of the right half is further demultiplexed into two spectra by {the FC 73a and the DMF 74*a*} and {the FC 73*b* and the DMF 74*b*}. Similarly, the demultiplexed spectrum of the left half is further demultiplexed into two spectra by {the FC 73*c* and the DMF 74*c*} and {the FC 73*d* and the DMF 74*d*}. According to this series of processing, the spectrum of the input signal is demultiplexed into four sub-channels in total.

Thereafter, in the signal demultiplexed into four by the processing, while adjacent unnecessary waves are removed by the channel filters (CFs) 76, waveforms of spectra in sub-channel bands are shaped. When the CFs 76 are provided respectively for the outputs of the DMFs 74*a* to 74*d* to perform the processing, a required number of the CFs 76 is four in the demultiplexing unit 221 and is twelve in total (=4×3) in the demultiplexing unit 221 and the demultiplexing units 222 and 223. In this embodiment, the required number of the channel filters (FCs) 76 is reduced.

When the reception analog switch matrix 21 performs load distribution to set an upper limit of a signal bandwidth processed by one digital demultiplexing substrate to 0.4 GHz, a ratio of a significant signal passing trees is 2/5 (=0.4 GHz/1 GHz). Therefore, even if the twelve channel filters (CFs) are provided, the number of CFs through which the significant signal actually passes is approximately five (≡12×2/5). Therefore, it is possible to reduce the circuit size of the CFs to approximately 0.4 times (twelve to five) by shifting the function of the CFs from the demultiplexing units to the switch unit 224 and performing the processing by the CFs for only the significant signal extracted by the selector 75 of the switch unit 224.

That is, the selector 75 in the switch unit 224 selects significant sub-channels (up to five), which are communication waves, among the input twelve sub-channels on the basis of control information from the control station 5 and connects the sub-channels to the CFs 76*a* to 76*e*. On the other hand, the selector 75 discards the other meaningless sub-channels. The CFs 76*a* to 76*e* apply removal of adjacent components and waveform shaping to the significant sub-channels selected by the selector 75. The framer 77 subjects output data of the CFs 76*a* to 76*e* to framing suitable for a high-speed interface such as SERDES and transmits the output data to the switch matrix unit 3.

Note that the CFs 76 are disposed in the switch units {224, 234, and 244}. However, the CFs 76 can be disposed in the switch matrix unit 3 or the switch units {424, 434, and 444} rather than in the switch units {224, 234, and 244}.

In this embodiment, the configuration for demultiplexing the channel into the four sub-channels is explained as an example. However, the number of demultiplexed sub-channels is not limited to four, but at least two will be sufficient. In this embodiment, the mounting of the three demultiplexing units on the one digital demultiplexing substrate is explained as an example. However, the number of demultiplexing units is not limited to three and only has to be two or more.

In the fourth embodiment, the functional blocks are grouped and represented by the name of substrates. However, each of the groups does not always need to be configured by one substrate. For example, a plurality of groups can be present on one substrate. Further, each group can be configured by anything other than a substrate as long as it is regarded as being grouped. For example, one substrate can be one integrated circuit {FPGA, ASIC, etc.}.

According to the processing explained above, the required number of the CFs 76 can be reduced. Therefore, the circuit size on the digital demultiplexing substrate decreases. As a result, power consumption can also be reduced.

Fifth Embodiment

In this embodiment, a configuration in a demultiplexing system in which a polyphase filter and FFT (Fast Fourier transform) or DFT (Discrete Fourier Transform) are used is transformed to reduce a circuit size. A channel filter (CF) function obtained by the transformation is cut out. Only a significant signal is processed by the CF. Consequently, the circuit size of a demultiplexing unit can be further reduced.

Figure 9:
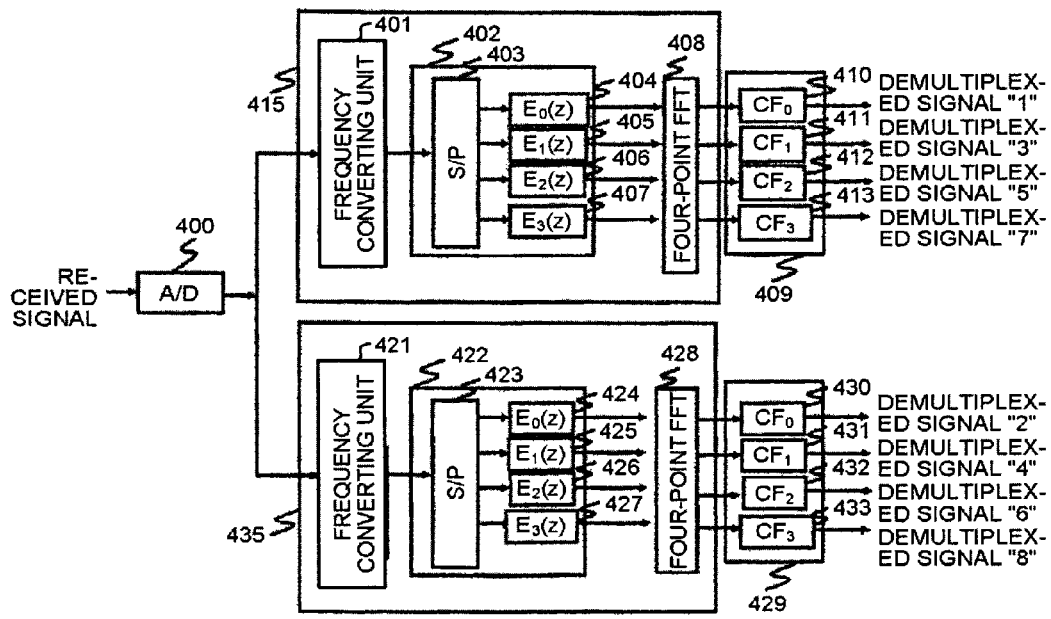
FIG. 9 is a diagram showing the configuration of a demultiplexing unit in a fifth embodiment.

FIG. 9 is a configuration example of the digital demultiplexing units 22 to 24 in this embodiment. The digital demultiplexing units 22 to 24 include an analog digital converter (A/D) 400, an odd-number demultiplexing unit 415, an even-number demultiplexing unit 435, and channel filters 410 to 413 and 430 to 433. The odd-number demultiplexing unit 415 and the even-number demultiplexing unit 435 include frequency converting units 401 and 421, polyphase filter banks 402 and 422, and four-point FFTs 408 and 428. The polyphase filter banks 402 and 422 include serial parallel converters (S/P) 403 and 423 and polyphase filters 404 to 407 and 424 to 427.

Figure 10:
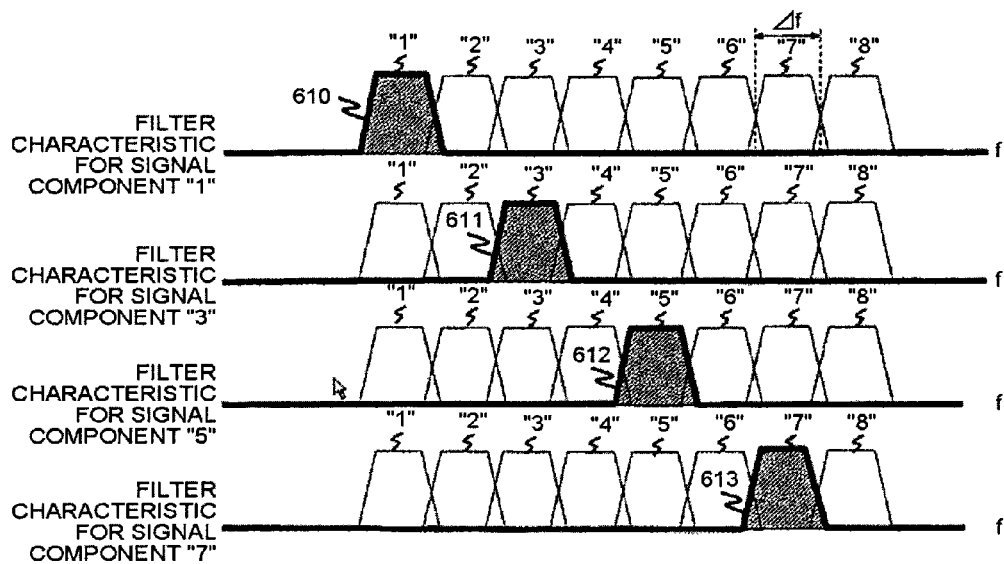
FIG. 10 is a diagram showing frequency characteristics in a conventional odd-number demultiplexing unit 415.
Figure 11:
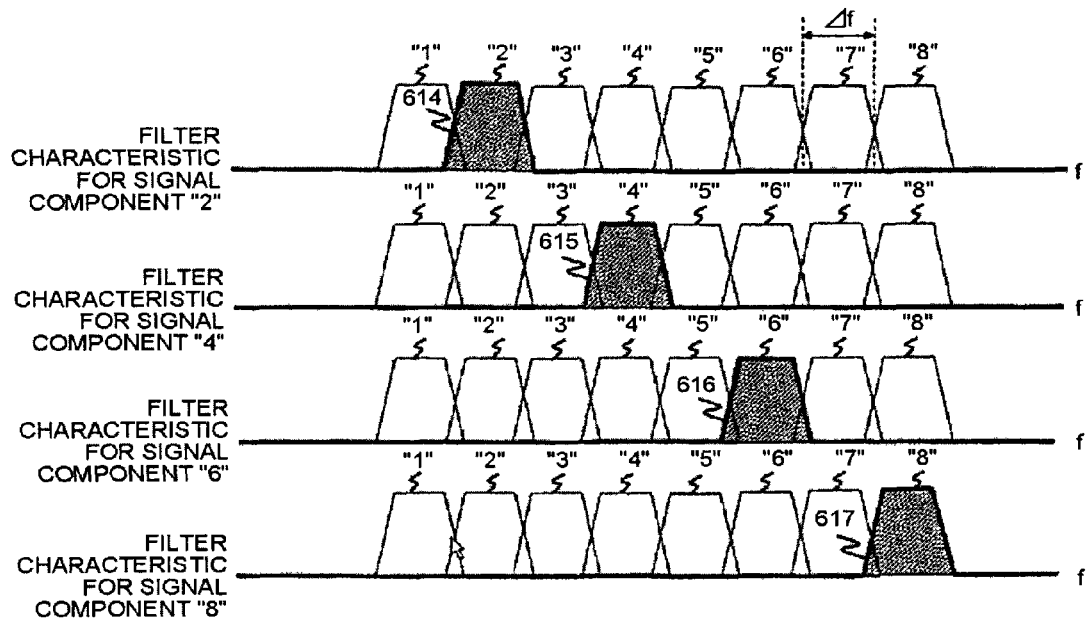
FIG. 11 is a diagram showing frequency characteristics in a conventional even-number demultiplexing unit 435.
Figure 12:
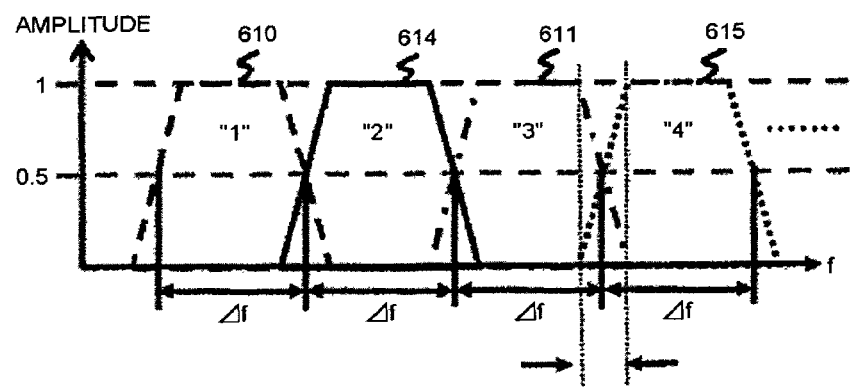
FIG. 12 is a diagram showing frequency characteristics of demultiplexing filters.

Baseband signals sampled by the AD converter 400 are input to the odd-number demultiplexing unit 415 and the even-number demultiplexing unit 435. Each of the signals after AD conversion are demultiplexed into four. In Non Patent Literature 1, the baseband signals sampled by the AD converter 400 are demultiplexed into eight (=4×2) sub-channels in total by both of the add-number demultiplexing unit 415 and the even-number demultiplexing unit 435. In FIG. 10, frequency characteristics in the odd-number demultiplexing unit 415, to which the conventional technology is applied, are indicated by thick lines. The conventional odd-number demultiplexing unit 415 demultiplexes four signal bands {"1", "3", "5", and "7"} in total according to frequency characteristics 610, 611, 612, and 613 indicated by the thick lines in FIG. 10. Similarly, the conventional even-number demultiplexing unit 435 demultiplexes four signal bands {"2", "4", "6", and "8"} in total according to frequency characteristics 614, 615, 616, and 617 indicated by thick lines in FIG. 11. To restore the demultiplexed signals to original signal spectra during multiplexing, characteristics of the demultiplexing filters need to be designed such that, as shown in FIG. 12, during multiplexing, an amplitude total of frequency characteristics adjacent to each other is 1 and a crossing point of the frequency characteristics is amplitude of 0.5.

Figure 13:
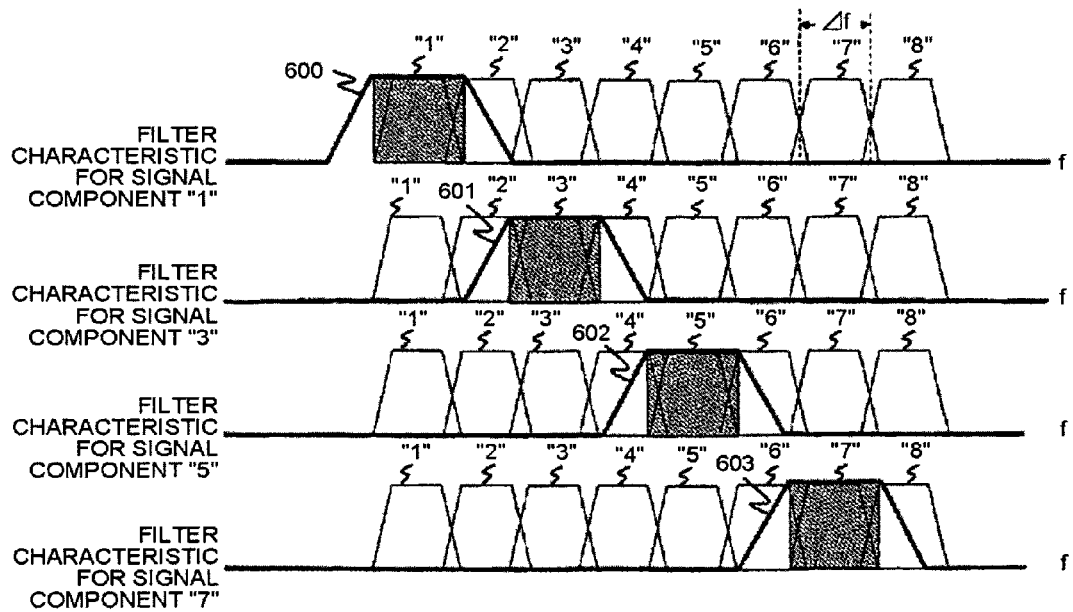
FIG. 13 is a diagram showing frequency characteristics in the odd-number demultiplexing unit 415 in the fifth embodiment.
Figure 14:
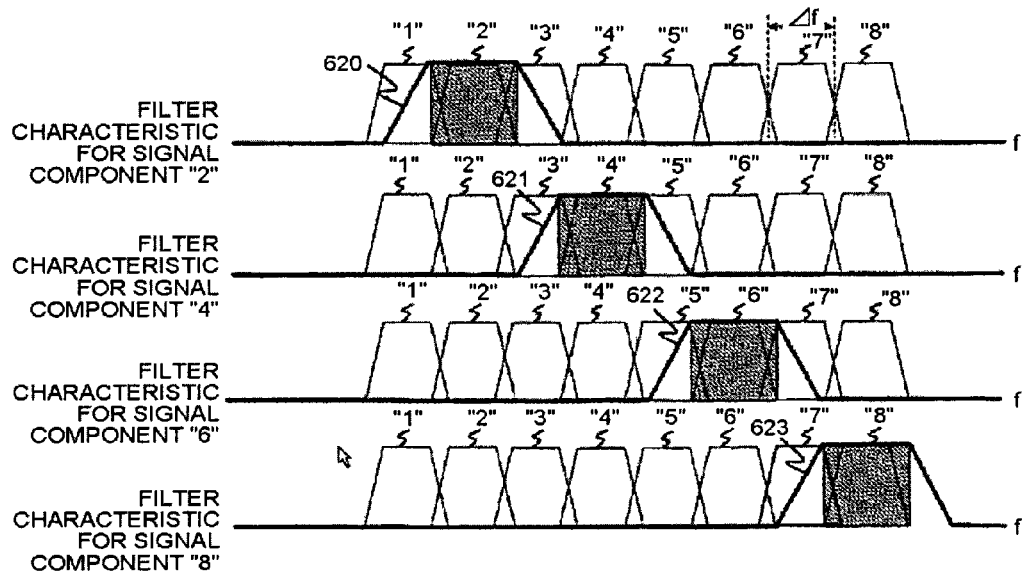
FIG. 14 is a diagram showing frequency characteristics in the even-number demultiplexing unit 435 in the fifth embodiment.

In this embodiment, the filter characteristics are relaxed as shown in FIG. 13 and FIG. 14 to reduce the circuit size of the polyphase filter. A channel filter (CF) that performs waveform shaping and adjacent wave removal is separately provided to realize original signal spectrum restoration during multiplexing. An increase in the circuit size at the time when the CF is added is smaller than a decrease in the circuit size of the polyphase filter. Therefore, the circuit size can be reduced as a whole. Details are explained below with reference to FIG. 9.

When a bandwidth of a sub-channel (=a channel after demultiplexing) is represented as Δ (delta) f, the signal input to the odd-number demultiplexing unit 415 is frequency-shifted +0.5Δf by the frequency converting unit 401 and thereafter input to the polyphase filter bank 402. The polyphase filter bank 402 divides, with a serial parallel converter (S/P) 403, input data into four reception data sequences. The divided data are subjected to filter processing by the polyphase filters 404 to 407. The four-point FFT 408 subjects data output from the polyphase filters 404 to 407 to FFT. According to this series of processing, the odd-number demultiplexing unit 415 demultiplexes the signal bands {"1", "3", "5", and "7"} from the input signal. Similarly, the signal input to the even-number demultiplexing unit 435 is frequency-shifted −0.5Δf by the frequency converting unit 421 and thereafter input to the polyphase filter bank 422. The polyphase bank 422 divides, with a serial parallel converter (S/P) 423, input data into four reception data sequences. The divided data are subjected to filter processing by the polyphase filters 424 to 427. The four-point FFT 428 subjects data output from the polyphase filters 424 to 427 to FFT. According to this series of processing, the even-number demultiplexing unit 435 demultiplexes the signal bands {"2", "4", "6", and "8"} from the input signal.

The frequency characteristics of the odd-number demultiplexing unit 415 and the even-number demultiplexing unit 435 are relaxed as shown in FIG. 13 and FIG. 14. That is, during down-sampling performed in demultiplexing, until immediately before alias components overlap a main signal component, transition regions of the filter characteristics of the odd-number demultiplexing unit 415 and the even-number demultiplexing unit 435 are expanded to relax the frequency characteristics.

Figure 15:
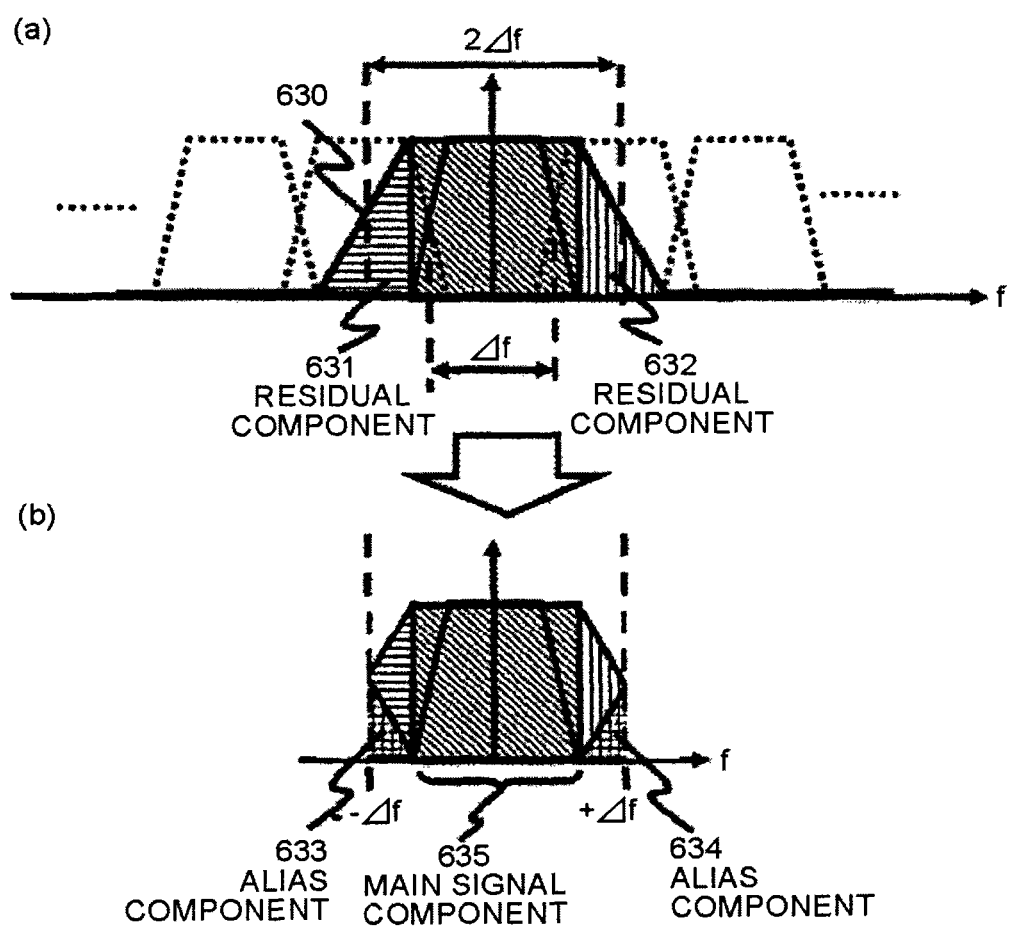
FIG. 15 is a diagram showing signal processing of the odd-number demultiplexing unit 415 and the even-number demultiplexing unit 435 in the fifth embodiment.

A specific processing example is shown in FIG. 15. FIG. 15(a) shows a state in which a signal is extracted according to the frequency characteristic of the odd-number demultiplexing unit 415 or the even-number demultiplexing unit 435 in the fifth embodiment. A pass band including a necessary sub-channel signal is a portion in the center (having a bandwidth of Δf) indicated by hatching. Adjacent components 631 and 632 that cannot be removed remain on the left and right. FIG. 15(b) shows a spectrum after the signal shown in FIG. 15(a) is down-sampled at sampling speed of 2Δf.

A signal bandwidth shown in FIG. 15(a) exceeds 2Δf. Therefore, as shown in FIG. 15(b), the residual components not fit in the bandwidth 2Δf are folded back into the band (the bandwidth 2Δf) as alias components (633 and 634). The odd-number demultiplexing unit 415 or the even-number demultiplexing unit 435 in this embodiment relaxes the frequency characteristic of the odd-number demultiplexing unit 415 or the even-number demultiplexing unit 435 such that the folded-back alias components approach the pass band indicated by the hatching until immediately before the alias components overlap the pass band. For example, in the case of a nyquist filter, a roll-off ratio of the alias components is increased such that the alias components approach immediately before the pass band indicated by the hatching.

According to the relaxing of the frequency characteristics, it is possible to reduce a required number of taps of the polyphase filters in the odd-number demultiplexing unit 415 and the even-number demultiplexing unit 435.

Figure 16:
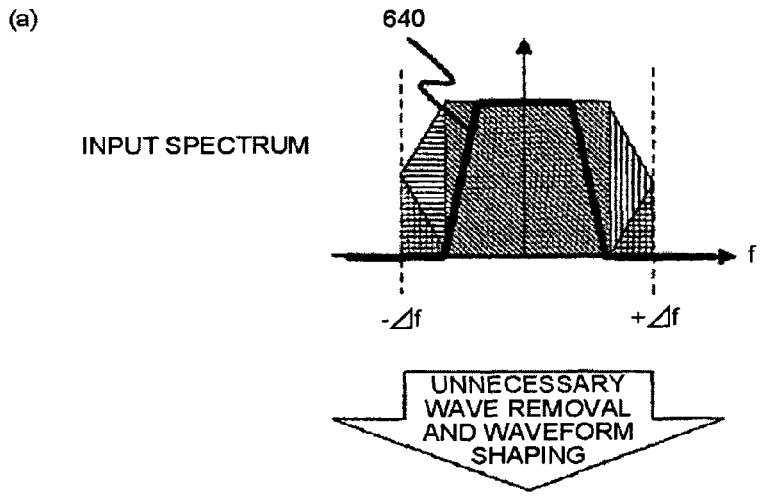
FIG. 16 is a diagram showing signal processing of a channel filter (CF).
Figure 16:
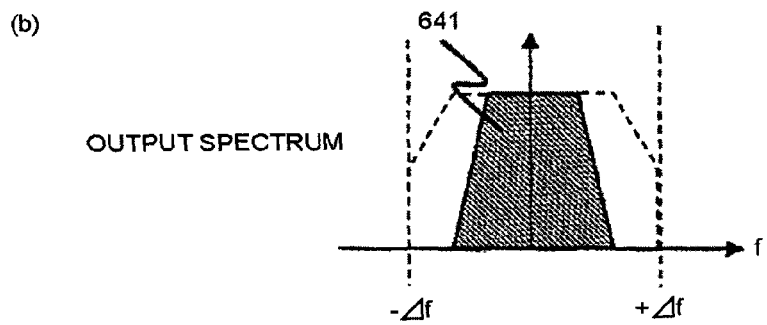

Subsequently, as shown in FIG. 9, the eight demultiplexed data in total output from the odd-number demultiplexing unit 415 and the even-number demultiplexing unit 435 are input to the channel filter banks 409 and 429. Removal of adjacent components and waveform shaping are performed in the channel filters (CFs) 410 to 413 and 430 to 433. A specific processing example is shown in FIG. 16. FIG. 16(a) is an input spectrum to the CF. FIG. 16(b) is an output spectrum. As it is evident from FIG. 16, unnecessary adjacent components other than a hatching are removed and a pass band indicated by the hatching is shaped. A frequency characteristic 640 of the CF shown in FIG. 16(a) is designed such that, as shown in FIG. 12, during multiplexing, an amplitude total of frequency characteristics adjacent to each other is 1 and a crossing point of the frequency characteristics is amplitude of 0.5.

Processing by the CF shown in FIG. 16 does not have to be applied to all the demultiplexed data (eight in total) output from the odd-number demultiplexing unit 415 and the even-number demultiplexing unit 435 at the pre-stage. In a system for combining the polyphase filters and the FFTs, because of characteristics of the system, not only a target band originally desired to be demultiplexed but also demultiplexed data other than the target located in adjacent bands is always present. For example, even when it is desired to demultiplex the target band into six, six demultiplexed data equivalent to the target band are selected from the eight demultiplexed data obtained by this configuration and the remaining two demultiplexed data are discarded. Therefore, in this case, the eight CFs do not need to be provided. Six CFs only have to be provided.

Consequently, an increase in the circuit size due to the CF addition is suppressed. As a result, in addition to the effect of the reduction in the circuit size of the polyphase filters, it is possible to reduce the circuit size of the demultiplexing unit as a whole.

Note that, in the fifth embodiment, the processing for performing demultiplexing in the combination of {the polyphase filters, the FFTs, and the CFs} is explained. However, the FFTs are not always necessary and can be DFTs. In the case of the FFTs, the number of demultiplexed sub-channels is a power of two same as the number of points of the FFTs. On the other hand, in the case of the DFTs, although the circuit size is larger than the FFTs, there is an advantage that it is possible to realize the number of demultiplexed sub-channels in any value as long as the value is 2 or more.

Even in the case of the DFTs, because of characteristics of a system of the DFTs, not only a target band originally desired to be demultiplexed but also demultiplexed data other than the target located in adjacent bands is always present. Therefore, as in the case of the FFTs, the CFs only have to apply the processing to demultiplexed data in which the target band is present. The processing by the CFs does not always have to be performed after the FFTs. For example, the CFs can be moved to the switch matrix unit 3 to perform the processing in the switch matrix unit 3. Alternatively, the processing can be performed before IFFT processing performed in the multiplexing unit corresponding to a beam area at a transmission destination. In this case, the multiplexing unit performs processing opposite to the demultiplexing and is realized by a combination of {the CFs, IFFTs, and the polyphase filters}. That is, demultiplexed data subjected to adjacent wave component removal and waveform shaping processing by the CFs in the multiplexing unit is subjected to IFFT and thereafter input to the polyphase filters. The processing itself by the IFFT to the polyphase filters in the multiplexing unit is the same as the processing in Non Patent Literature 1. As a characteristic, because the adjacent wave component removal and the waveform shaping processing are performed in the CFs beforehand, the polyphase filters in the multiplexing unit can also relax the frequency characteristics like the polyphase filters in the demultiplexing unit. That is, image components are generated by up-sampling during multiplexing. However, as in the case of the alias components, even if transition regions of the filter characteristics of the multiplexing units are expanded until immediately before the image components overlap a main signal component, the image components can be removed. Therefore, it is possible to reduce a required number of taps of the polyphase filters on the multiplexing side.

Sixth Embodiment

In this embodiment, the method of performing demultiplexing in the combination of {the polyphase filters, the FFTs, and the CFs} is incorporated in the configuration explained in the first embodiment and the second embodiment to reduce the circuit size of the demultiplexing unit.

Figure 17:
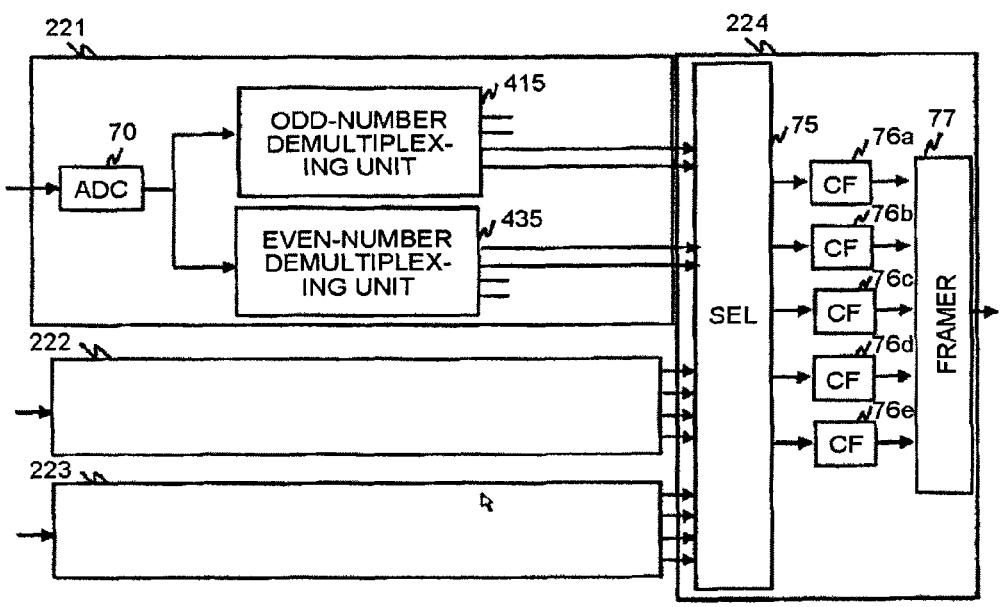
FIG. 17 is a diagram showing a configuration example of a digital demultiplexing substrate.

FIG. 17 shows a functional block diagram of the digital demultiplexing substrate 22 in this embodiment. As a demultiplexing system, the combined system of {the polyphase filters, the FFTs, and the CFs} described in the fifth embodiment is applied. FIG. 17 shows a configuration example in which this system is applied.

The demultiplexing unit 221 indicates a configuration for demultiplexing a channel A signal into four sub-channels. Note that the configuration in the demultiplexing units 222 and 223 are also the same as the configuration of the demultiplexing unit 221. Therefore, explanation of details is omitted.

In the demultiplexing unit 221, an input signal spectrum AD-converted by the ADC 70 is demultiplexed into eight by the odd-number demultiplexing unit 415 and the even-number demultiplexing unit 435. Among eight demultiplexed data, the demultiplexing unit 221 selects four demultiplexed data equivalent to a target band, outputs the demultiplexed data to a circuit, and discards the remaining four demultiplexed data equivalent to a non-target region.

In the signal demultiplexed into four by the processing, thereafter, spectra in sub-channel bands need to be waveform-shaped while adjacent unnecessary waves are removed by the channel filters (CFs). A required number of the CFs is twelve (=4×3) in total in the demultiplexing unit 221 and the demultiplexing units 222 and 223.

An object in the embodiment is to reduce the required number of the channel filters (CFs). For example, when the reception analog switch matrix at the pre-stage performs load distribution to set an upper limit of a signal bandwidth processed by one digital demultiplexing substrate to 0.4 GHz, a ratio of a significant signal being output from the demultiplexing units 221, 222, and 223 is 2/5 (=0.4 GHz/1 GHz). Therefore, even if the twelve channel filters (CFs) are provided, the number of CFs through which the significant signal actually passes is approximately five (≡12×2/5). Therefore, as in the fourth embodiment, it is possible to reduce the circuit size of the CFs to approximately 0.4 times (twelve to five) by shifting the function of the CFs from the demultiplexing units to the switch unit 224 and performing the processing by the CFs for only the significant signal extracted by the selector 75 of the switch unit 224.

That is, the selector 75 in the switch unit 224 selects significant sub-channels (up to five), which are communication waves, among the input twelve sub-channels on the basis of control information from the control station 5 and connects the sub-channels to the CFs 76a to 76e. On the other hand, the selector 75 discards the other meaningless sub-channels.

The CFs 76a to 76e apply removal of adjacent components and waveform shaping to the significant sub-channels selected by the selector 75. The framer 77 subjects output data of the CFs 76a to 76e to framing suitable for a high-speed interface such as SERDES and transmits the output data to the switch matrix unit 3.

According to the series of processing, even in the method of performing demultiplexing in the combination of {the polyphase filters, the FFTs, and the CFs}, as in the tree system explained in the fourth embodiment, the required number of the CFs can be reduced. Therefore, the circuit size on the digital demultiplexing substrate decreases. As a result, power consumption can also be reduced.

Note that the CFs are disposed in the switch units {224, 234, and 244}. However, the CFs can be disposed in the switch matrix unit 3 or the switch units {424, 434, and 444} rather than in the switch units {224, 234, and 244}.

In this embodiment, the configuration for demultiplexing the channel into the four sub-channels is explained as an example. However, the number of demultiplexed sub-channels is not limited to four, but at least two will be sufficient. Further, in this embodiment, the mounting of the three demultiplexing units on the one digital demultiplexing substrate is explained as an example. However, the number of demultiplexing units is not limited to three, but at least two will be sufficient.

Note that, in this embodiment, the functional blocks are grouped and represented in the name of substrates. However, each of the groups does not always need to be configured by one substrate. For example, a plurality of groups can be present on one substrate. Further, each group can be configured by anything other than a substrate as long as it is regarded as being grouped. For example, one substrate can be one integrated circuit {FPGA, ASIC, etc.}.

REFERENCE SIGNS LIST

1 Relay apparatus
2 Receiving unit
3 Switch matrix unit
4 Transmitting unit
201 to 203 Reception antennas
401 to 403 Transmission antennas
211 to 213, 411 to 413 Beam areas
21 Reception analog switch matrix
22 to 24 Digital demultiplexing substrates
221 to 223, 231 to 233, 241 to 243 Demultiplexing units
224, 234, 244 Digital switch units
5 Control station
31 to 33, 51 to 53 Spectra
42 to 44 Digital multiplexing substrates
424, 434, 444 Digital switch units
421 to 423, 431 to 433, 441 to 443 Multiplexing units
41 Transmission analog switch matrix
60 Beam selection circuit
61 Band-pass filter (BPF)
62 Analog multiplier (Mixer)
63 Band-pass filter (BPF)
64 Frequency synthesizer
65 Band of a channel D
66 Band of a channel E
67 Band of a channel F
68 Local oscillator
69 3-to-3 analog switch matrix
70 Analog digital converter (ADC)
73 Frequency converters (FCs)
72, 74 ½ decimation filters (DMFs)
75 Selector (SEL)
76 Channel filter (CF)
77 Framer
400 Analog digital converter (A/D)
415 Odd-number demultiplexing unit
435 Even-number demultiplexing unit
401, 421 Frequency converting units
402, 422 Polyphase filter banks
408, 428 Four-point FFTs
402, 422 Polyphase filter banks
403, 423 Serial parallel converters (S/Ps)
404 to 407, 424 to 427 Polyphase filters
614 to 617 Frequency characteristics
409, 429 Channel filter banks
410 to 413, 430 to 433 Channel filters (CFs)

The invention claimed is:

1. A demultiplexing apparatus comprising:
a signal receiver that receives signals;
an analog demultiplexer that analog-demultiplexes, in predetermined units of channels, the received signals received by the signal receiver and generates and outputs analog demultiplexed signals; and
a plurality of digital demultiplexers that digital-demultiplex, in units of sub-channels, the analog demultiplexed signals output from the analog demultiplexer and generate digital demultiplexed signals,
wherein the analog demultiplexer allocates the analog demultiplexed signals to each of the plurality of digital demultiplexers based on an amount of bandwidth occupied by each respective one of the analog demultiplexed signals such that each of the plurality of digital demultiplexers receives an amount of signal-bearing bandwidth that is less than or equal to a threshold amount of bandwidth.

2. The demultiplexing apparatus according to claim 1, wherein the digital demultiplexer selects a signal in which a signal is present among the digital demultiplexed signals.

3. The demultiplexing apparatus according to claim 1, wherein the signal receiver receives signals from a plurality of beam areas, and the analog demultiplexer unit includes:
a beam selector that selects signals received from one beam area out of the received signals from the plurality of beam areas; and
a synthesizer that extracts, in units of channels, a received signal of a specific channel among the received signals selected by the beam selector.

4. The demultiplexing apparatus according to claim 1, wherein the digital demultiplexer includes a decimation filter and a channel filter,
wherein the decimation filter digital-demultiplexes the analog demultiplexed signals in units of sub-channels, and selects a digital demultiplexed signal in which a signal is present among the demultiplexed digital demultiplexed signals, and
wherein the channel filter performs removal of adjacent wave components and waveform shaping with respect to the selected digital demultiplexed signal.

5. The demultiplexing apparatus according to claim 4, wherein the decimation filter is configured by a combination of a polyphase filter and a Fast Fourier transformer.

6. A multiplexing apparatus comprising:
a switch matrix that outputs a plurality of digital demultiplexed signals demultiplexed into sub-channels;
a plurality of digital multiplexers that receive the digital demultiplexed signals, digital-multiplex the digital demultiplexed signals in predetermined units of channels, and generate digital multiplexed signals; and
an analog multiplexer that analog-multiplexes the digital multiplexed signals and generates analog multiplexed signals,
wherein the switch matrix allocates the digital demultiplexed signals to each of the plurality of digital multiplexers based on an amount of bandwidth occupied by each respective one of the digital demultiplexed signals such that each of the plurality of digital multiplexers receives an amount of signal-bearing bandwidth that is less than or equal to a threshold amount of bandwidth.

7. The multiplexing apparatus according to claim 6, wherein the digital multiplexer generates a desired channel using the digital multiplexed signals and empty data generated inside.

8. The multiplexing apparatus according to claim 6,
wherein the analog multiplexer includes a synthesizer, a beam selector, and a plurality of antennas,
wherein the synthesizer removes unnecessary frequency components from the received digital multiplexed signals, and
wherein the beam selector selects one antenna among a plurality of antennas to transmit the digital multiplexed signals, from which the unnecessary frequency components is removed, to a desired beam area.

9. A relay apparatus comprising:
a signal receiver that receives signals;
an analog demultiplexer that analog-demultiplexes, in predetermined units of channels, the received signals received by the signal receiver and generates and outputs analog demultiplexed signals;
a plurality of digital demultiplexers that digital-demultiplex, in units of sub-channels, the analog demultiplexed signals output from the analog demultiplexer and generate digital demultiplexed signals;
a switch matrix that outputs a plurality of the digital demultiplexed signals;
a digital multiplexer that receives the digital demultiplexed signals output from the switch matrix, digital-multiplexes the digital demultiplexed signals in predetermined units of channels, and generates digital multiplexed signals; and
an analog multiplexer that analog-multiplexes the digital multiplexed signals and generates analog multiplexed signals,
wherein the analog demultiplexer allocates the analog demultiplexed signals to each of the plurality of digital demultiplexers based on an amount of bandwidth occupied by each respective one of the analog demultiplexed signals such that each of the plurality of digital demultiplexers receives an amount of signal-bearing bandwidth that is less than or equal to a threshold amount of bandwidth.

10. A relay apparatus comprising:
a signal receiver that receives signals;
an analog demultiplexer that analog-demultiplexes, in predetermined units of channels, the received signals received by the signal receiver and generates and outputs analog demultiplexed signals;
a plurality of digital demultiplexers that digital-demultiplex, in units of sub-channels, the analog demultiplexed signals output from the analog demultiplexer and generate digital demultiplexed signals;
a switch matrix that outputs a plurality of the digital demultiplexed signals;
a plurality of digital multiplexers that receive the digital demultiplexed signals, digital-multiplex the digital demultiplexed signals in predetermined units of channels, and generate digital multiplexed signals; and
an analog multiplexer that analog-multiplexes the digital multiplexed signals and generates analog multiplexed signals,
wherein the switch matrix allocates the digital demultiplexed signals to each of the plurality of digital multiplexers based on an amount of bandwidth occupied by each respective one of the digital demultiplexed signals such that each of the plurality of digital multiplexers receives an amount of signal-bearing bandwidth that is less than or equal to a threshold amount of bandwidth.

* * * * *